US012036769B2

(12) United States Patent
Baker et al.

(10) Patent No.: US 12,036,769 B2
(45) Date of Patent: Jul. 16, 2024

(54) ULTRAVIOLET PROTECTIVE TRANSPARENCY

(71) Applicant: PPG Industries Ohio, Inc., Cleveland, OH (US)

(72) Inventors: Maria Christina Baker, Los Angeles, CA (US); Brent Wright, Valencia, CA (US); Khushroo Lakdawala, Chatsworth, CA (US); Kyle Salisbury, North Hollywood, CA (US); Fateme Sadat Emami, Canyon Country, CA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 29 days.

(21) Appl. No.: 16/463,295

(22) PCT Filed: Nov. 20, 2017

(86) PCT No.: PCT/US2017/062548
§ 371 (c)(1),
(2) Date: May 22, 2019

(87) PCT Pub. No.: WO2018/098074
PCT Pub. Date: May 31, 2018

(65) Prior Publication Data
US 2019/0375198 A1    Dec. 12, 2019

Related U.S. Application Data

(60) Provisional application No. 62/425,976, filed on Nov. 23, 2016.

(51) Int. Cl.
*B32B 15/04* (2006.01)
*B32B 17/06* (2006.01)
(Continued)

(52) U.S. Cl.
CPC .. *B32B 17/10678* (2013.01); *B32B 17/10036* (2013.01); *B32B 17/10651* (2013.01);
(Continued)

(58) Field of Classification Search
CPC .................. B32B 17/10036; B32B 17/10651
(Continued)

(56) References Cited

U.S. PATENT DOCUMENTS 4,513,061 A    4/1985  Kawakubo et al.
4,822,684 A *  4/1989  Hotta ...................... B32B 25/14
                                                    428/441

(Continued)

FOREIGN PATENT DOCUMENTS

CN    101595421 A    12/2009
CN    102460291 B    11/2015
(Continued)

OTHER PUBLICATIONS

Database WPI, Week 201548, Jun. 25, 2015, Thomson Scientific, London, GB, AN 2015-36049W, XP002777818 & WO 2015/093093 A1, Yokohama Rubber Co., Ltd, abstract, example 5, 2 pages.

(Continued)

*Primary Examiner* — Lauren R Colgan

(57) ABSTRACT

A transparency includes an additive such that the transparency blocks greater than 50% of light of a wavelength range of 400 nm to 430 nm as measured by ultraviolet-visible spectroscopy from passing through the transparency and the transparency has a total visible light transmittance of greater than 65% as measured by way of ASTM D1003-07. A transparency includes an additive such that the transparency blocks greater than 70% of the light of the wavelength range of 400 nm to 430 nm as measured by ultraviolet-visible spectroscopy from passing through the transparency and the (Continued)

transparency has a total visible light transmittance of greater than 60% as measured by way of ASTM D1003-07.

17 Claims, 10 Drawing Sheets

(51) Int. Cl.
    *B32B 17/10*      (2006.01)
    *C08G 18/42*      (2006.01)
    *C08G 18/48*      (2006.01)
    *C08G 18/75*      (2006.01)
    *C08K 5/3472*     (2006.01)

(52) U.S. Cl.
    CPC ..... *C08G 18/4236* (2013.01); *C08G 18/4858* (2013.01); *C08G 18/758* (2013.01); *C08K 5/3472* (2013.01); *B32B 2571/02* (2013.01); *B32B 2605/006* (2013.01); *B32B 2605/18* (2013.01)

(58) Field of Classification Search
    USPC ............... 428/426, 428, 432, 434, 701, 702
    See application file for complete search history.

(56) References Cited

U.S. PATENT DOCUMENTS

| | | | |
|---|---|---|---|
| 6,446,402 B1 | 9/2002 | Byker et al. | |
| 8,004,764 B2* | 8/2011 | Artsyukhovich | G02B 5/28 |
| | | | 359/589 |
| 8,360,574 B2* | 1/2013 | Ishak | G02C 7/108 |
| | | | 351/159.6 |
| 9,063,349 B2* | 6/2015 | Ishak | G02C 7/102 |
| 9,482,880 B1* | 11/2016 | Chandrasekhar | G02F 1/163 |
| 9,522,517 B2* | 12/2016 | Lu | B32B 17/06 |
| 11,084,753 B2* | 8/2021 | Seto | B60J 1/00 |
| 2005/0243272 A1 | 11/2005 | Martin et al. | |
| 2007/0129492 A1 | 6/2007 | Colborn et al. | |
| 2007/0173627 A1* | 7/2007 | Rukavina | C08G 18/10 |
| | | | 528/44 |
| 2008/0171808 A1* | 7/2008 | Rukavina | C08G 18/75 |
| | | | 523/135 |
| 2008/0231795 A1 | 9/2008 | Cartier | |
| 2010/0220388 A1 | 9/2010 | Suzuki et al. | |
| 2010/0315693 A1* | 12/2010 | Lam | G02C 7/102 |
| | | | 359/241 |
| 2011/0092619 A1 | 4/2011 | Amasaki et al. | |
| 2012/0075168 A1* | 3/2012 | Osterhout | G06F 3/011 |
| | | | 345/8 |
| 2012/0194418 A1* | 8/2012 | Osterhout | G02B 27/0149 |
| | | | 345/156 |
| 2015/0036204 A1 | 2/2015 | Branda et al. | |
| 2015/0064374 A1* | 3/2015 | Jain | B32B 17/10036 |
| | | | 156/60 |
| 2015/0109651 A1 | 4/2015 | Branda et al. | |
| 2015/0246508 A1 | 9/2015 | Oota et al. | |
| 2015/0301367 A1 | 10/2015 | Mennig | |
| 2015/0370094 A1 | 12/2015 | Hashimoto et al. | |
| 2016/0060160 A1 | 3/2016 | Machida et al. | |
| 2016/0159048 A1* | 6/2016 | Ukidwe | C08K 5/103 |
| | | | 524/543 |
| 2016/0303831 A1* | 10/2016 | Cloots | B32B 17/10036 |
| 2017/0090217 A1* | 3/2017 | Nahm | B29D 11/00009 |
| 2018/0321513 A1* | 11/2018 | Carrega | G02C 7/104 |

FOREIGN PATENT DOCUMENTS

| | | |
|---|---|---|
| CN | 105793362 A | 7/2016 |
| JP | 5459446 | 4/2014 |
| WO | WO2008/067109 A1 | 6/2008 |
| WO | WO2010/142019 A1 | 12/2010 |
| WO | 2015093093 A1 | 6/2015 |
| WO | WO 2015/156273 A1 | 10/2015 |

OTHER PUBLICATIONS

Database WPI, Week 201426, Apr. 2, 2014, Thomson Scientific, London, GB, AN 2014-F65108, XP002777819 & JP5459446B1, Yokohama Rubber Co., Ltd, abstract, paragraph [0023], example 4, claims 1, 2, 4, 2 pages.
English translation of Office action, Search Report issued in related Chinese Application No. 201780072396.2, May 24, 2021, 11 pages.
English translation of Office action issued in related Chinese Application No. 201780072396.2, mailed Dec. 9, 2021, 7 pages.
English translation of Rejection Decision issued in related Chinese Application No. 201780072396.2, Mar. 22, 2022, 7 pages.
European Search Report issued in related EPA22213710.1 on Mar. 15, 2023, 11 pages.

\* cited by examiner

ULTRAVIOLET PROTECTIVE TRANSPARENCY

CROSS-REFERENCE TO RELATED APPLICATION

This application claims priority to and the benefit of U.S. Provisional Application No. 62/425,976, filed in the U.S. Patent and Trademark Office on Nov. 23, 2016.

FIELD

The present disclosure relates to a transparency including an additive such that the transparency blocks greater than 50% of light of a wavelength range of 400 nm to 430 nm as measured by ultraviolet-visible spectroscopy from passing through the transparency and the transparency has a total visible light transmittance greater than 60% as measured by way of ASTM D1003-07. The present disclosure also relates to a transparency including an additive such that the transparency blocks greater than 50% of light of a wavelength range of 400 nm to 430 nm as measured by ultraviolet-visible spectroscopy from passing through the transparency and the transparency has a total visible light transmittance of greater than 65% as measured by way of ASTM D1003-07. The present disclosure also relates to a transparency including an additive such that the transparency blocks greater than 70% of the light of the wavelength range of 400 nm to 430 nm as measured by ultraviolet-visible spectroscopy from passing through the transparency and the transparency has a total visible light transmittance of greater than 60% as measured by way of ASTM D1003-07.

BACKGROUND

Certain wavelengths of light may cause chemical reactions when the light is incident to certain organic compounds or other materials. Consequently, when the light is incident to organisms (e.g., humans) the light may produce chemical reactions within the organism, which may lead to tissue damage (e.g., cancer, eye damage such as macular degeneration, cataracts, etc.). Additionally, when the light is incident to certain materials (e.g., inorganic and/or organic materials), such as those found in an interior of a vehicle or structure (e.g., furnishings, fabrics, surfaces, electronic equipment, and the like), the light may contribute to the degradation of the materials over time.

Transparencies such as, for example, transparencies for vehicles (e.g., aerospace vehicles), allow a substantial portion of light, particularly light at a frequency of 400 to 430 nm (e.g., violet light or high energy blue light), to pass through the transparency. Organisms exposed to light having a wavelength of 400 nm to 430 nm that passes through such transparencies may experience tissue damage, and vehicle or structure interiors exposed to such light may experience degradation.

SUMMARY

A transparency includes an additive such that the transparency blocks greater than 50% of light of a wavelength range of 400 nm to 430 nm as measured by ultraviolet-visible spectroscopy from passing through the transparency and the transparency has a total visible light transmittance of greater than 60% as measured by way of ASTM D1003-07. A transparency includes an additive such that the transparency blocks greater than 70% of the light of the wavelength range of 400 nm to 430 nm as measured by ultraviolet-visible spectroscopy from passing through the transparency and the transparency has a total visible light transmittance of greater than 60% as measured by way of ASTM D1003-07.

BRIEF DESCRIPTION OF THE DRAWINGS

The accompanying drawings, together with the specification, illustrate the subject matter of the present disclosure, and, together with the description, serve to explain principles of the subject matter of the present disclosure.

DETAILED DESCRIPTION

Figure 1:
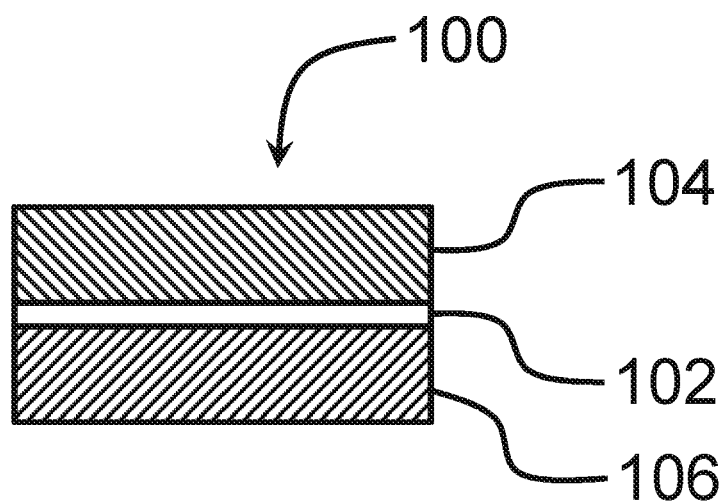
FIG. 1 is a cross-sectional view of a transparency according to the present disclosure.

The present disclosure is directed toward a transparency that blocks at least a portion of light of a wavelength range of 400 nm to 430 nm. The transparency includes an additive such that the transparency blocks greater than 50% of light of a wavelength range of 400 nm to 430 nm from passing through the transparency and the transparency has a total visible light transmittance of greater than 65%. The transparency may include the additive such that the transparency blocks greater than 70% of the light of the wavelength range of 400 nm to 430 nm from passing through the transparency and the transparency has a total visible light transmittance of greater than 60%. Transparencies as described herein may have a total visible light transmittance of greater than 65% (or greater than 70%, greater than 75%, greater than 80%, greater than 85%, greater than 90%, or greater than 95%).

As described herein, the amount of light of a wavelength range that is blocked refers to an average amount of light of the entire wavelength range that is blocked. This may include that the amount of light at each wavelength of the wavelength range that is blocked is as high as well. For example, a transparency that blocks greater than 50% of light of a wavelength range of 400 nm to 430 nm, may block an average of greater than 50% of light of the wavelength range of 400 nm to 430 nm (e.g., where the % blockage is calculated from the average across the wavelength range of 400 nm to 430 nm), and may optionally block greater than 50% of the light at each wavelength of the range of 400 nm to 430 nm as well.

As described herein, the amount of light blocked by the transparency refers to, for the given wavelength range, the amount of light that is incident to the transparency and not transmitted (e.g., not fully transmitted) through the transparency. The remaining portion of the light may be transmitted (e.g., fully transmitted) through the transparency. For example, for a transparency that blocks greater than 50% of light of the wavelength range of 400 nm to 430 nm, at most 50%, for the given wavelength range and optionally also for each wavelength within the range, of the light that is incident to the transparency is transmitted through the transparency (e.g., transmitted from a first side of the transparency to a second side of the transparency facing the first side). The greater than 50% of the light of the wavelength range of 400 nm to 430 nm may be blocked by any suitable mechanism such as, for example, light absorption, light reflection, light refraction, or any other suitable mechanism, but the present disclosure is not limited thereto.

As used herein, the terms "wavelength range of" and "in the range of" include the end points of the range (e.g., 400 nm and 430 nm) in addition to the values between the end points. Additionally, the transparency described herein may block up to 60%, 65%, 70%, 75%, 80%, 85%, 90%, 95%, 96%, 99%, 99.5%, 99.9%, 99.99%, 99.999%, or 100% of the light of the wavelength range described. The amount of light blocked by the transparency was measured utilizing ultraviolet-visible spectroscopy, which may also be referred to as ultraviolet-visible spectrophotometry, UV-Vis, or UV/Vis. For example, the amount of light blocked may be determined from the average of the amount of light blocked of the given wavelength range, from the amount of light blocked at each wavelength of the given wavelength range, or from both, as measured by ultraviolet-visible spectroscopy. Thus, the transparency blocks greater than 50% of light of the wavelength range of 400 nm to 430 nm, as measured by ultraviolet-visible spectroscopy. Additionally, the total visible light transmittance described herein (e.g., a total visible light transmittance of greater than 65%), was measured by way of ASTM D1003-07.

The transparency may also block at least a portion of other light in addition to the light of the wavelength range of 400 nm to 430 nm. For example, the transparency may block greater than 70% (or greater than 75%, 80%, 85%, 90%, 95%, 99.0%, 99.5%, or 99.9%) of ultraviolet C light (UVC, e.g., light of a wavelength range of 100 nm to 280 nm), may block greater than 70% (or greater than 75%, 80%, 85%, 90%, 95%, 99.0%, 99.5%, or 99.9%) of ultraviolet B light (UVB, e.g., light of a wavelength range of 280 nm to 315 nm), and/or may block greater than 70% (or greater than 75%, 80%, 85%, 90%, 95%, 99.0%, 99.5%, or 99.9%) ultraviolet A light (UVA, e.g., light of a wavelength range of 315 nm to 400 nm). The transparency may block greater than 70% (or 75%, 80%, 85%, 90%, 95%, 99%, 99.5%, or 99.9%) of light of a wavelength range of 100 nm to 315 nm from passing through the transparency.

Because the amount of light blocked may be an average of the light blocked across a wavelength range, the amount of light blocked across a subrange subsumed within a broader range may be different from the amount of light blocked across the broader range. For example, a transparency that blocks greater than 50% of light of the wavelength range of 400 nm to 430 nm may block greater than 45% (or greater than 50%, greater than 55%, greater than 75%, greater than 80%, or greater than 95%) of light of a wavelength range of 400 nm to 410 nm. The transparency may block greater than 40% (or greater than 55%, greater than 90%, greater than 95%, or greater than 98%) of light of a wavelength range of 380 nm to 410 nm. The transparency may block greater than 60% (or greater than 64%, greater than 70%, greater than 90%, greater than 95%, greater than 96%, or greater than 99%) of light of a wavelength range of 200 nm to 420 nm. The transparency may additionally block any suitable amount of light having a wavelength greater than 430 nm (e.g., violet light of a wavelength range of 430 nm to 450 nm, and/or blue light of a wavelength range of 450 nm to 490 nm).

In the present disclosure, the numerical ranges described include all subranges subsumed therein. For example, the wavelength range of 400 nm to 430 nm includes a wavelength range of 400 nm to 420 nm, or any wavelength range including 400 nm, 401 nm, 402 nm, 403 nm, 404 nm, 405 nm, 406 nm, 407 nm, 408 nm, 409 nm, 410 nm, 411 nm, 412 nm, 413 nm, 414 nm, 415 nm, 416 nm, 417 nm, 418 nm, 419 nm, 420 nm, 421 nm, 422 nm, 423 nm, 424 nm, 425 nm, 426 nm, 427 nm, 428 nm, 429 nm, or 430 nm as a starting point or end point of the wavelength range.

Additionally, each of the light blockage ranges described herein includes all subranges subsumed therein. For example, a transparency that blocks greater than 50% of the light of the wavelength range of 400 nm to 430 nm may block any amount of light in the range of 50% to 100%, as measured by ultraviolet-visible spectroscopy. The transparency may block greater than 60%, greater than 61%, greater than 65%, greater than 70%, greater than 71%, greater than 72%, greater than 73%, greater than 74%, greater than 75%, greater than 80%, greater than 85%, greater than 90%, greater than 95%, greater than 99%, greater than 99.1%, greater than 99.2%, greater than 99.3%, greater than 99.4%, greater than 99.5%, greater than 99.6%, greater than 99.7%, greater than 99.8%, greater than 99.9%, greater than 99.98%, or greater than 99.99% of the light of the wavelength range of 400 nm to 430 nm, as measured by ultraviolet-visible spectroscopy, where the upper limit of each of the foregoing is 100%.

By blocking greater than 50% of the light of the wavelength range of 400 nm to 430 nm from being transmitted through the transparency, the transparency reduces the risk of cancer and/or ocular damage (e.g., macular degeneration, cataracts, etc.) for organisms in the vicinity of the transparency, and/or may reduce damage to an interior (e.g., to furnishing, fabrics, surfaces, electronic equipment, and the like) of a vehicle or structure including the transparency, by decreasing the total exposure of the organism and/or the interior of the vehicle or structure to damaging light (e.g., light having a wavelength of 400 nm to 430 nm). For example, the transparency reduces the exposure of an occupant of a vehicle or structure including the transparency to light of a wavelength range of 400 nm to 430 nm while inside of the vehicle or structure, thereby improving the safety of the occupant (e.g., by reducing damage that may lead to macular degeneration, cataracts, etc.). The transparency improves the safety of a pilot, crew, and/or passenger while inside of an aircraft including the transparency by reducing exposure of the pilot, crew, and/or passenger to light of a wavelength range of 400 nm to 430 nm. Further, the transparency reduces the exposure of an interior of the vehicle including the transparency to light of a wavelength range of 400 nm to 430 nm, thereby reducing degradation of items in the vehicle interior (e.g., furnishings, electronic equipment, and the like) that otherwise would be degraded by the light having a wavelength of 400 nm to 430 nm.

The transparency may be used with the vehicle in any suitable manner. For example, the transparency includes a window, a windshield, and/or a canopy of the vehicle. The transparency is not limited to vehicles, and may be used in a complex, thick or multiple layer laminate system designed for high impact or ballistic applications such as bullet resistant transparencies in or out of a vehicle. For example, the transparency may be used as blast barriers or high impact resistant barriers for use on land or in a vehicle. Non-limiting examples of ballistic applications include a ballistic shield (e.g., a blast shield for bomb squads), bullet resistant automobile transparencies, and impact resistant transparent barriers used between the cockpit and the cabin of a commercial aircraft.

In the present disclosure, the term "vehicle" is used in its broadest sense and includes any suitable vehicle such as, for example, all types of aircraft, spacecraft, watercraft, and ground vehicles. For example, the vehicle may include, but is not limited to aircraft such as, for example, airplanes (e.g., private airplanes, and small, medium, or large commercial passenger, freight, and military airplanes), helicopters (e.g., private, commercial, and military helicopters), aerospace vehicles (e.g., rockets and other spacecraft), autonomous vehicles, low flying vehicles (e.g., autonomous low flying vehicles), and the like. The vehicle may also include a ground vehicle such as, for example, animal trailers (e.g., horse trailers), cars, trucks, buses, vans, heavy duty equipment, golf carts, motorcycles, bicycles, trains, railroad cars and the like. The vehicle may also include watercraft such as, for example, ships, boats, hovercraft, and the like. The transparency may be included in any suitable manner in the F/A-18 jet (or derivations or variants thereof, such as, for example, the F/A-18E Super Hornet and F/A-18F; produced by McDonnell Douglas/Boeing and Northrop) and/or the Boeing 787 Dreamliner, 737, 747, and/or 717 passenger jet aircraft (or derivations or variants thereof; produced by Boeing Commercial Airplanes); V-22 Osprey; VH-92 and S-92 (or derivations or variants thereof; produced by NAVAIR and Sikorsky); the G650, G600, G550, G500 and G450 (or derivations or variants thereof; produced by Gulfstream); and the A350, A320, and/or A330 (or derivations or variants thereof; produced by Airbus). The transparency may be included in any suitable commercial, military, or general aviation aircraft such as, for example, those produced by Bombardier Inc. and/or Bombardier Aerospace (e.g., the Canadair Regional Jet (CRJ) and derivatives thereof), Lockheed Martin (e.g., the F-22 Raptor, the F-35 Lightning, and derivatives thereof), Northrop Grumman (e.g., the B-2 Spirit and derivatives thereof), Pilatus Aircraft Ltd., and Eclipse Aviation Corporation or Eclipse Aerospace (now Kestrel Aircraft).

The transparency may be used with the structure in any suitable manner. For example, the transparency may be included in an interior or exterior window or door of the structure; as a whole or part of a door, separator or barrier inside the structure; and/or as a stand-alone article (e.g., a blast barrier or screen). Additionally, in the present disclosure, the term "structure" is used in its broadest sense and includes all types of structures. For example, the structure may include, but is not limited to ground structures such as, for example, commercial buildings (e.g., office buildings), hospitals, factories, multi-use buildings, and residences (e.g., apartment buildings, condominiums, townhomes, and single family homes).

The transparency may block the light of the wavelength range of 400 nm to 430 nm by including the additive, which may include light blocking compounds and/or light absorbing compounds (e.g., compounds that block, reflect, refract, and/or absorb light having a wavelength of 400 nm to 430 nm). The additive may include additional compounds such as, for example, light stabilizers that scavenge radicals resulting from the absorption of light (e.g., light having a wavelength of 400 nm to 430 nm) by other components of the transparency. The additive may be included in the transparency in any amount suitable for achieving the amount of light blocking described herein. For example, the additive (e.g., the light blocking compounds and/or light absorbing compounds) may be included in an amount of 0.00001 wt % to 10 wt % (or any range subsumed therein), based on the total weight of the transparency. The additive (e.g., the light blocking compounds and/or light absorbing compounds) may be included in a composition for forming the transparency in an amount of 0.00001 wt % to 10 wt % (or any range subsumed therein), based on the total weight of the solids of a composition for forming a layer of the transparency. For example, the additive (e.g., the light blocking compounds and/or light absorbing compounds) may be included in either of the foregoing in an amount of 0.00001 wt % to 0.01 wt %; 0.001 wt % to 5 wt %; 0.01 wt % to 2 wt %; 0.01 wt % to 1.9 wt %; 0.1 to 1.8 wt %; 0.3 wt % to 1.5 wt %; 0.5 wt % to 1.3 wt %; 0.6 wt % to 1.25 wt %; 0.9 wt % to 1.2 wt %; 0.01 wt % to 0.02 wt %; 0.02 wt % to 0.04 wt %; 2 wt % to 5 wt %; or 3 wt % to 4 wt %), based on the total weight of the transparency or the total weight of solids in the composition for forming a layer of the transparency.

According to the present disclosure, the additive may have a combination of light blockage (e.g., blockage of light of a wavelength range of 400 nm to 430 nm) and durability with exposure to light and weathering. Examples of the additive include classes of chemical compounds including: inorganic nanoparticles (e.g., metal oxides and metal nanoparticles), organic nanoparticles, organometallic nanoparticles, benzotriazoles, triazines, benzophenones, hindered amine light stabilizers (HALS), benzoates, cyanoacrylates, tetraphenylporphyrins, tetramesitylporphyrins, perylenes, oxalanilides, phthalocyanines, chlorophylls (including derivatives thereof), bilirubin (including derivatives thereof), primary antioxidants, pigments dyes (e.g., organometallic dyes), and combinations thereof. Non-limiting examples of the dye include bilirubin; chlorophyll a, diethyl ether; chlorophyll a, methanol; chlorophyll b; diprotonated-tetraphenylporphyrin; hematin; magnesium octaethylporphyrin; magnesium octaethylporphyrin (MgOEP); magnesium phthalocyanine (MgPc), PrOH; magnesium phthalocyanine (MgPc), pyridine; magnesium tetramesitylporphyrin (MgTMP); magnesium tetraphenylporphyrin (MgTPP); octaethylporphyrin; phthalocyanine (Pc); porphin; tetra-t-butylazaporphine; tetra-t-butylnaphthalocyanine; tetrakis(2,6-dichlorphenyl)porphyrin; tetrakis(o-aminophenyl)porphyrin; tetramesitylporphyrin (TMP); tetraphenylporphyrin (TPP); vitamin B12; zinc octaethylporphyrin (ZnOEP); zinc phthalocyanine (ZnPc), pyridine; zinc tetramesitylporphyrin (ZnTMP); zinc tetramesitylporphyrin radical cation; zinc tetraphenylporphyrin (ZnTPP); perylene; oxanilide; derivatives thereof; and combinations thereof.

The additive may be chosen from metal oxides, benzotriazoles (including derivatives thereof), triazines (including derivatives thereof), triazoles (including derivatives thereof), hindered amine light stabilizers (HALS, including derivatives thereof), silanes having amine functionality (including derivatives thereof), sterically hindered phenolic antioxidants (including derivatives thereof), silanes having isocyanate functionality (including derivatives thereof), and mixtures thereof. The inorganic nanoparticles may include a metal oxide chosen from cerium oxide (e.g., $CeO_2$), zinc oxide (e.g., ZnO), and the like, but the inorganic nanoparticles are not limited thereto. The additive may include a benzotriazole a triazine, a dye, a hindered amine light stabilizer, or a combination thereof in an amount of 0.01 wt % to 2.0 wt %, based on the total weight of the transparency. For example, the additive may include the benzotriazole, the dye, the hindered amine light stabilizer, or the combination thereof in an amount of 0.01 wt % to 1.5 wt %, based on the total weight of the transparency.

The additive may include a pyrrolo[3,4-f]benzotriazole-5,7(2H,6H)-dione. For example, a non-limiting example of the additive includes 6-butyl-2-[2-hydroxy-3-(1-methyl-1-phenylethyl)-5-(1,1,3,3-tetramethylbutyl)phenyl] pyrrolo[3,4-f]benzotriazole-5,7(2H,6H)-dione (commercially available as TINUVIN® CARBOPROTECT® (each available from BASF SE of Ludwigshafen, Germany). Additional, non-limiting commercial examples of the benzotriazole include TINUVIN® 99-2, TINUVIN® 384-2, TINUVIN® 900, and TINUVIN® 1130 (each available from BASF SE of Ludwigshafen, Germany), and CHIGUARD R-455 available from Chitec Technology Co., Ltd. of Taipei, Taiwan. Non-limiting commercial examples of the HALS include TINUVIN® 123, TINUVIN® 144, and TINUVIN® 292, each available from BASF SE of Ludwigshafen, Germany. Non-limiting commercial examples of the triazine include TINUVIN® 400, TINUVIN® 405, TINUVIN® 460, TINUVIN® 477, and TINUVIN® 479, each available from BASF SE of Ludwigshafen, Germany. Non-limiting commercial examples of the dye (e.g., the organometallic dye) include Cu(II) Meso-tetra (4-carboxyphenyl) porphine (e.g., High Performance Optics Dye Generation4D, available from High Performance Optics of Roanoke, Va., or any other suitable High Performance Optics Dye, including Generation 4A, 4B, and/or 4C).

Non-limiting commercial examples of the additive may also include: a TINUVIN® compound (e.g., TINUVIN® 151, TINUVIN® 152, TINUVIN® 213, TINUVIN® 234, TINUVIN® 326, TINUVIN® 327, TINUVIN® 328, TINUVIN® 571, TINUVIN® 622, TINUVIN® 765, TINUVIN® 770, and/or TINUVIN® P; each available from BASF SE of Ludwigshafen, Germany), an IRGANOX® compound (e.g., IRGANOX® 245, IRGANOX® 1010, IRGANOX® 1035, IRGANOX® 1076, IRGANOX® 1098, IRGANOX® 1135, and/or IRGANOX® 5057; each available from BASF SE of Ludwigshafen, Germany), Unitex OB (available from Angene Chemica of Hong Kong), a CHIMASSORB® compound (e.g., CHIMASSORB® 81, CHIMASSORB® 944 LD, and/or CHIMASSORB® 2020 FLD; each available from BASF SE of Ludwigshafen, Germany), a BLS® compound (e.g., BLS® 99-2, BLS® 119, BLS® 123, BLS® 234, BLS® 292, BLS® 531, BLS® 0113-3, BLS® 1130, BLS® 1326, BLS® 1328, BLS® 1710, BLS® 2908, BLS® 3035, BLS® 3039, and/or BLS® 5411; each available from Mayzo Inc. of Suwanee, Ga., USA), and/or CYASORB CYNERGY SOLUTIONS® L143-50X Stabilizer (available from Cytec Industries, Inc. of Woodland Park, NJ, USA).

The additive may include TINUVIN® CARBOPROTECT®, TINUVIN® 477 (which includes a red-shifted Tris-Resorcinol-Triazine Chromophore), compounds available from High Performance Optics of Roanoke, Va. (e.g., Generation 4B dye and/or Generation 4D dye), TINUVIN® 292, and/or TINUVIN® 1130. The additive may be included in the transparency, for example, by mixing with the polymer precursors for forming the transparency, at a wt % of 0.00001 wt % to 10 wt % (e.g., 0.001 wt % to 5 wt %; 0.01 wt % to 2 wt %; 0.01 wt % to 1.9 wt %; 0.1 to 1.8 wt %; 0.3 wt % to 1.5 wt %; 0.5 wt % to 1.3 wt %; 0.6 wt % to 1.25 wt %; 0.9 wt % to 1.2 wt %; 0.01 wt % to 0.02 wt %; 0.02 wt % to 0.04 wt %; 2 wt % to 5 wt %; or 3 wt % to 4 wt %), based on the total weight of the transparency or the total weight of the solids in a composition for forming a layer of the transparency.

The additive may include a functional group that facilitates incorporation of the additive into the transparency, for example, by improving chemical integration of the additive into the chemical backbone of a layer of the transparency during polymerization. The functional group may be chosen from amines, alcohols, or other functional groups that impart reactive functionality to the additive and do not inhibit the light absorptive or protective properties of the additive. The functional group may also tether the additive to the chemical backbone of the layer of the transparency to prevent or reduce migration of the additive to a surface of the layer, thereby preventing or reducing blooming as the product ages with weathering. Additionally, by reducing or preventing migration of the additive to a surface of the layer of the transparency, the properties of the layer (e.g., adhesiveness, smoothness, etc.) may be relatively unaffected by the presence of the additive in the layer. As such, the layer including the additive may have substantially the same surface properties as a layer having substantially the same composition without the additive. In a non-limiting example, the additive includes Cu(II) Meso-tetra (4-carboxyphenyl) porphine (commercially available as Generation 4D dye), which has four carboxylic groups. While the present disclosure is not limited by any particular mechanism or theory it is believed that the carboxylic groups reduce the likelihood or amount of migration of the additive and/or blooming.

The additive may be included in any suitable layer of the transparency in any suitable manner. For example, the additive may be included in a resin for forming a layer of the transparency. The additive may be added to a component for forming the resin and/or may be added to the resin directly. Further, the additive may be added to the resin before and/or during polymerization (e.g., curing). The resin may be polymerized to directly form the layer. The resin may be polymerized to form a polymerized product, which may be granulated, melt-processed, and extruded to form a layer. The additive may be added before and/or during the resin curing, and/or during the melt processing. For example, the additive (e.g., the Generation 4D dye) may be dispersed into the polyol portion of an interlayer formulation prior to polymerization, and/or the additive may be added to the polymer granulate during the extrusion process.

The additive may be included in an interlayer that may be utilized with any suitable transparency. For example, FIG. 1 is a cross-sectional view of a transparency 100 according to the present disclosure. The transparency 100 includes an interlayer 102 between a first substrate 104 and a second substrate 106. Any of the interlayer 102, the first substrate 104, and/or the second substrate 106 may include the additive described herein. The first and second substrates 104 and 106 may include any suitable substrate for a transparency. For example, the first substrate 104 and the second substrate 106 may include any suitable substrate such as, for example, glass and/or polymer (e.g., plastic). The glass of the transparency may include any suitable glass such as, for example, clear float glass, water white glass, soda lime glass, lithium aluminosilicate glass, window glass, unibatch glass, borosilicate glass, heat absorbing blue and/or green glass, and low iron glass (e.g., STARPHIRE® glass commercially available from Vitro Architectural Glass of Cheswick, Pa.). Non-limiting commercial examples of the glass may include CORNING® GORILLA® glass (available from Corning Inc. of Corning, NY), SOLIDION® glass (available from Saint-Gobain Sully of Courbevoie, France), Chemplex 2000 (available from GKN Aerospace of Phoenix, AZ). The glass may be tempered (e.g., chemically tempered and/or thermally tempered). Non-limiting commercial examples of chemically tempered glass include such HERCULITE® or HERCULITE® II glass available from Vitro Architectural Glass of Cheswick, Pa. A polymer of the transparency may include polycarbonate, acrylic, stretched acrylic, allyl diglycol carbonate (e.g., CR-39, available from PPG Industries Inc. of Pittsburgh, Pa.), polyurethane (e.g., S-123 available from PPG Industries Inc. of Pittsburgh, Pa.), plastic (e.g., OPTICOR® ATM, available from PPG Industries Inc. of Pittsburgh, Pa.), polyurea, polyvinyl, and/or silicone.

The transparency may have any suitable thickness. The thickness of the transparency may affect the light transmittance and % light blockage of the transparency, and therefore, the thickness of the transparency may be tailored to the desired properties. For example, the interlayer 102 of FIG. 1 may have a thickness of 0.1 mm to 25 mm (e.g., 0.1 mm to 2.5 mm, 0.25 mm to 10 mm, 0.5 mm to 5 mm, 1 mm to 4 mm, or 2 mm to 3 mm). Each of the first and second substrates 104 and 106 may have a thickness of 0.25 mm to 150 mm (e.g., 1 mm to 15 mm, 2.5 mm to 50 mm, 5 mm to 30 mm, or 10 mm to 25 mm). Any of the transparency 100, interlayer 102, first substrate 104, and second substrate 106 of FIG. 1 may be made to have a thickness and additive concentration sufficient to block greater than 50% of light of a wavelength range of 400 nm to 430 nm and have a total visible light transmittance of greater than 65%.

The concentration of the additive in the transparency may be varied depending upon the thickness of the transparency cross-section, and/or the composition of the transparency. Relatively lower concentrations (e.g., 0.00001 wt % to 5 wt %) of additives (e.g., the light blocking compounds and/or light absorbing compounds) may be utilized for transparencies including S-123 and/or OPTICOR® ATM, each available from PPG Industries Inc. of Pittsburgh, Pa., and/or in a layer of the transparency having a thickness in a range of 0.5 mm to 50 mm. Relatively higher concentrations (e.g., 5 wt % to 10 wt %) of additives may be used in a layer of the transparency that has a relatively smaller thickness such as, for example, a layer transparency having a thickness in a range of 1 µm to 100 µm. The relatively thinner layer of the transparency may be utilized in an interior coating that is not exposed directly to the elements and is adhered to another component of the transparency such as, for example, another layer (e.g., a coating), a substrate, and/or an interlayer of the transparency. The layer of the transparency may include an interlayer having a thickness of 0.1 mm to 4 mm and may adhere to coated or uncoated layers such as, for example, transparency plies or interlayers, which may include glass, polycarbonate, acrylic, stretched acrylic, allyl diglycol carbonate (e.g., CR-39, available from PPG Industries Inc. of Pittsburgh, Pa.), polyurethane (e.g., S-123 available from PPG Industries Inc. of Pittsburgh, Pa.), plastic (e.g., OPTICOR® ATM, available from PPG Industries Inc. of Pittsburgh, Pa.), polyurea, polyvinyl, and/or silicone.

The interlayer may also be utilized with other layers such as, for example, additional interlayers. The transparency may include a plurality of interlayers (e.g., four interlayers) stacked together, of which one or more (or only one) of the interlayers may include the additive described herein. Further, one or more of the plurality of interlayers may be substantially free or completely free of the additive and may be any suitable interlayer generally used for transparencies.

As used herein in the present disclosure and claims, the phrase "substantially free of the additive" indicates that the additive is only present, if at all, as an incidental impurity. By including interlayers that are substantially free or completely free of the additive and that are generally used for transparencies, the adhesive performance of those interlayers does not need to be evaluated utilizing expensive qualification testing, thereby reducing the cost of production of the transparency and reducing the development time for the transparency. For example, the plurality of interlayers may have predictable adhesive performance with respect to substrates including polycarbonate, acrylic (e.g., polyacrylate), glass, and/or the like.

The transparency may include glass, which may have reduced UV blocking properties as compared to transparencies prepared utilizing polymers. Accordingly, the interlayer may be utilized with a glass substrate to provide a transparency having improved UV blocking properties. The interlayer may be made to be thin such that the interlayer may be used with a glass substrate without making the resultant transparency overly thick. The additive may be incorporated in the glass substrate. For example, the interlayer may have a thickness of 0.1 to 25 mm, 0.1 mm to 2.5 mm, 0.25 mm to 10 mm, 0.5 mm to 5 mm, 1 mm to 4 mm, 2 mm to 3 mm, 0.2 to 0.9 mm, 0.3 to 0.7 mm, 0.4 to 0.7 mm, 0.5 to 0.7 mm, 0.6 to 0.7 mm, or any sub-range subsumed therein. For example, the interlayer may have a thickness of 0.635 mm (e.g., a thickness of 25 mil) or less. In addition to blocking at least a portion of light of a wavelength of 400 nm to 430 nm, the interlayer may be UV stable and weather stable during the duration of the expected life of an aircraft transparency and do not impede or reduce (or do not substantially impede or reduce) adhesion between structural layers (e.g., between first and second substrates), or alter greatly in yellowness index value, light transmission, haze or color such as to cause the total transparency not to conform to the accepted requirements for the transparency. For improved stability, lower concentrations of the additive may be used if comparable results are achieved. A hindered amine light stabilizer may be incorporated with a UV absorber and/or another stabilizer at a concentration ratio of 1:2 or 1:3 (hindered amine light stabilizer:UV absorber and/or another stabilizer).

Figure 2:
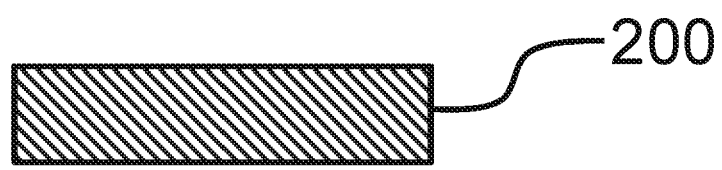
FIG. 2 is a cross-sectional view of a transparency according to the present disclosure.

The additive may be incorporated directly into a substrate, and the substrate may be included in a transparency with or without an interlayer. For example, FIG. 2 is a cross-sectional view of a transparency 200 according to the present disclosure. The transparency 200 may include a substrate including the additive such that the substrate blocks at least a portion of light of a wavelength of 400 nm to 430 nm (e.g., the substrate may include the additive such that the substrate blocks greater than 50% of light of a wavelength of 400 nm to 430 nm). The substrate 200 may further include polyurethane, plastic, and/or polyurea. For example, the substrate may include a polyurethane including S-123 and/or a plastic including OPTICOR® ATM, each available from PPG Industries Inc. of Pittsburgh, Pa.

The substrate including a polyurethane may include a reaction product of components including an isocyanate and an aliphatic polyol having 4 to 18 carbon atoms (or any range subsumed therein, for example, 5 to 17 carbon atoms, 6 to 16 carbon atoms, 7 to 15 carbon atoms, 8 to 14 carbon atoms, or 9 to 13 carbon atoms) and 2 hydroxyl groups (or 3 or more hydroxyl groups), wherein the isocyanate and/or the aliphatic polyol may be branched or unbranched. As used herein, the term "an isocyanate" may mean "at least one polyisocyanate" and the term "an aliphatic polyol" may mean "at least one aliphatic polyol." According to the present disclosure, the isocyanate and/or the polyol may be branched. As used herein, the term "branched" means a chain of atoms with one or more side chains attached to it. Branching occurs by the replacement of a substituent, e.g., a hydrogen atom, with a covalently bonded functional substituent or moiety, e.g., an hydroxyalkyl group. As used herein, the term "isocyanate" means a compound including an —N=C=O functional group and/or an —N=C=S (isothiocyanate) group and is construed broadly to include polyisocyanates that include two or more —N=C=O functional groups and/or two or more —N=C=S (isothiocyanate) groups, such as diisocyanates, triisocyanates, or higher functional isocyanates, as well as dimers and trimers or biurets of isocyanates. The isocyanate may be capable of forming a covalent bond with a reactive group such as a hydroxyl, thiol, or amine functional group. Branched isocyanates may be used to increase the free volume within a polymer matrix formed by the polyurethane to provide space for the molecules to move.

Non-limiting examples of suitable isocyanates include aliphatic, cycloaliphatic, aromatic, heterocyclic, sulfonate containing, and/or self-healing molecules, e.g., alkoxyamines, dimers and trimers thereof, and mixtures thereof. Non-limiting examples of suitable cycloaliphatic isocyanates include those in which one or more of the isocyanate groups are attached directly to the cycloaliphatic ring and cycloaliphatic isocyanates in which one or more of the isocyanate groups are not attached directly to the cycloaliphatic ring. Non-limiting examples of suitable aromatic isocyanates include those in which an isocyanate group is attached directly to the aromatic ring, and aromatic isocyanates in which an isocyanate group is not attached directly to the aromatic ring. Non-limiting examples of suitable heterocyclic isocyanates include those in which an isocyanate group is attached directly to the heterocyclic ring and heterocyclic isocyanates in which an isocyanate group is not attached directly to the heterocyclic ring. Non-limiting examples of suitable isocyanates may include DESMODUR W (4,4'-methylene-bis-(cyclohexyl isocyanate) or 1-Isocyanato-4-[(4-isocyanatocyclohexyl)methyl]cyclohexane), DESMODUR N 3300 (hexamethylene diisocyanate trimer), and DESMODUR N 3400 (60% hexamethylene diisocyanate dimer and 40% hexamethylene diisocyanate trimer), which are commercially available from Bayer Corp. of Pittsburgh, Pa.

As used herein, the term "polyol" includes compounds, monomers, oligomers, and polymers including at least two hydroxyl groups, e.g., including two hydroxyl groups (such as diols) or three hydroxyl groups (such as triols), higher functional polyols, and mixtures thereof. Non-limiting suitable polyols are capable of forming a covalent bond with a reactive group such as an isocyanate functional group. Non-limiting examples of suitable polyols include aliphatic, cycloaliphatic, aromatic, heterocyclic, oligomeric polyols, polymeric polyols, and mixtures thereof. For transparencies or windows exposed to sunlight, aliphatic or cycloaliphatic polyols may be used. The number of carbon atoms in the polyol may range from 4 to 18, from 4 to 12, from 4 to 10, from 4 to 8, or from 4 to 6 carbon atoms. A carbon atom in the polyol may be replaced with a heteroatom, such as N, S, or O.

Non-limiting examples of trifunctional, tetrafunctional, or higher functional polyols suitable for use as the polyol include branched chain alkane polyols such as glycerol or glycerin, tetramethylolmethane, trimethylolethane (e.g., 1,1,1-trimethylolethane), trimethylolpropane (TMP; e.g., 1,1,1-trimethylolpropane), erythritol, pentaerythritol, dipentaerythritol, tripentaerythritol, sorbitan, alkoxylated derivatives thereof, and mixtures thereof. The polyol may be a cycloalkane polyol, such as trimethylene bis(1,3,5-cyclohexanetriol), and/or the polyol may be an aromatic polyol, such as trimethylene bis(1,3,5-benzenetriol).

Transparencies according to the present disclosure may also include any suitable layers available in the art. For example, any of the transparencies disclosed herein may further include any suitable hardcoat, heater coating film, conductive layer, scratch resistant thin glass or abrasion resistant plastic, antifog, hydrophilic film, or the like available in the art.

Figure 3:
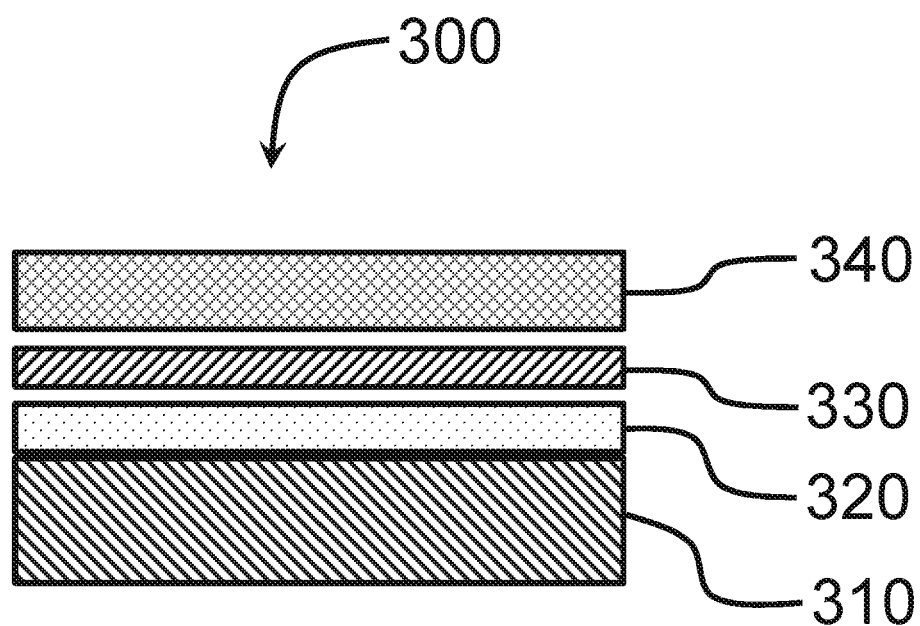
FIG. 3 is a cross-sectional view of a transparency according to the present disclosure.

FIG. 3 is a cross-sectional view of a transparency 300 according to the present disclosure. The transparency 300 includes a first substrate 310, which may include glass (e.g., STARPHIRE® or SOLARPHIRE® glass commercially available from Vitro Architectural Glass of Cheswick, Pa., thermally tempered soda lime glass, and/or chemically tempered glass such as, for example, HERCULITE® or HERCULITE® II glass available from Vitro Architectural Glass of Cheswick, Pa.), polycarbonate, acrylic, stretched acrylic, allyl diglycol carbonate (e.g., CR-39, available from PPG Industries Inc. of Pittsburgh, Pa.), polyurethane, plastic, polyurea, polyvinyl, and/or silicone. In FIG. 3, a conductive layer 320 is on the first substrate 310. The conductive layer 320 may include any suitable conductive layer such as, for example, a metal oxide layer, a metal layer, and/or a metal oxide layer (e.g., a stack including an indium tin oxide and/or aluminum doped zinc oxide layer, a gold and/or silver layer, and an indium tin oxide and/or aluminum doped zinc oxide layer). An interlayer 330 is on the conductive layer 320. The interlayer 330 may include any suitable interlayer material. For example, the interlayer 330 may include polyurethane, polyvinyl, press polished polyvinyl, and/or silicone. A second substrate 340 is on the interlayer 330. The second substrate 340 may be substantially the same as or different from the first substrate 310. The additive may be included in any or all of the layers of the transparency 300. The transparency 300 may further include an additional conductive layer, substrate, and/or interlayer. Any layer in the transparency 300 may have a thickness of 0.1 mm to 30 mm.

Figure 4:
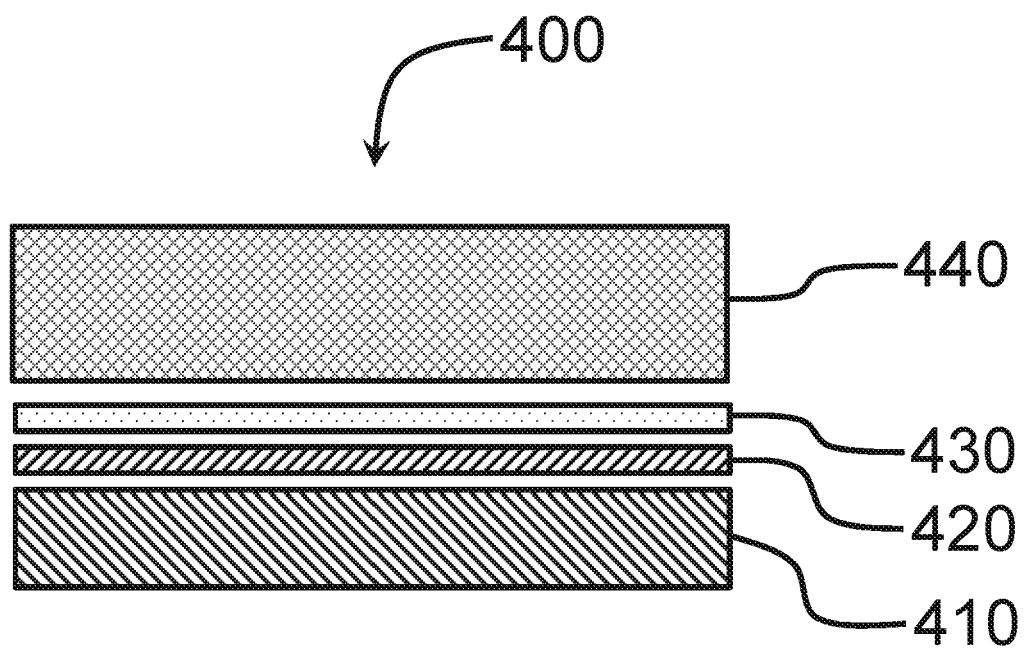
FIG. 4 is a cross-sectional view of a transparency according to the present disclosure.

FIG. 4 is a cross-sectional view of a transparency 400 according to the present disclosure. The transparency 400 includes a first substrate 410, which may include glass (e.g., STARPHIRE® or SOLARPHIRE® glass commercially available from Vitro Architectural Glass of Cheswick, Pa., thermally tempered soda lime glass, and/or chemically tempered glass such as, for example, HERCULITE® or HERCULITE® II glass available from Vitro Architectural Glass of Cheswick, Pa.), polycarbonate, acrylic, stretched acrylic, allyl diglycol carbonate (e.g., CR-39, available from PPG Industries Inc. of Pittsburgh, Pa.), and/or polyurethane. In FIG. 4, a first interlayer 420 is on the first substrate 410. The first interlayer 420 may include any suitable interlayer material. For example, the first interlayer 420 may include polyurethane-polyvinyl, press polished polyvinyl, and/or silicone. A second interlayer 430 is on the first interlayer 420. The second interlayer 430 may include any suitable interlayer material, and may be substantially the same as or different from the first interlayer 420. A second substrate 440 is on the second interlayer 430. The second substrate 440 may be substantially the same as or different from the first substrate 410. The additive may be included in any or all of the layers of the transparency 400. The transparency 400 may further include an additional substrate, and/or interlayer. Any layer in the transparency 400 may have a thickness of 0.1 mm to 30 mm.

Figure 5:
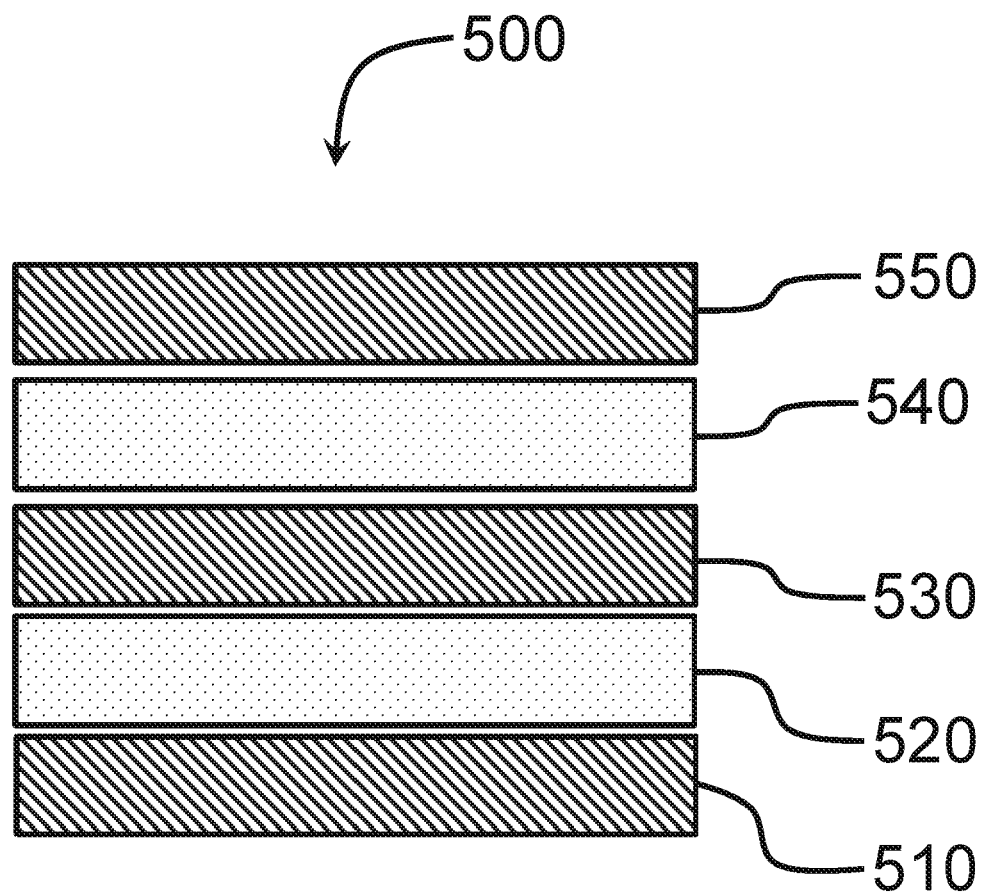
FIG. 5 is a cross-sectional view of a transparency according to the present disclosure.

FIG. 5 is a cross-sectional view of a transparency 500 according to the present disclosure. The transparency 500 includes a first substrate 510, which may include glass (e.g., STARPHIRE® or SOLARPHIRE® glass commercially available from Vitro Architectural Glass of Cheswick, Pa., thermally tempered soda lime glass, and/or chemically tempered glass such as, for example, HERCULITE® or HERCULITE® II glass available from Vitro Architectural Glass of Cheswick, Pa.), polycarbonate, acrylic, stretched acrylic, allyl diglycol carbonate (e.g., CR-39, available from PPG Industries Inc. of Pittsburgh, Pa.), polyurethane, plastic, polyurea, polyvinyl, and/or silicone. In FIG. 5, a first conductive layer 520 is on the first substrate 510. The first conductive layer 520 may include any suitable conductive layer such as, for example, a metal oxide layer, a metal layer, and/or a metal oxide layer (e.g., a stack including an indium tin oxide and/or aluminum doped zinc oxide layer, a gold and/or silver layer, and an indium tin oxide and/or aluminum doped zinc oxide layer). An interlayer 530 is on the first conductive layer 520. The interlayer 530 may include any suitable interlayer material. For example, the interlayer 530 may include polyurethane, polyvinyl, press polished polyvinyl, and/or silicone. A second conductive layer 540 is on the interlayer 530. The second conductive layer 540 may include any suitable conductive material such as, for example, indium tin oxide. A second substrate 550 is on the second conductive layer 540. The second substrate may be substantially the same as or different from the first substrate 510. The additive may be included in any or all of the layers of the transparency 500. The transparency 500 may further include an additional conductive layer, substrate, and/or interlayer. Any layer in the transparency 500 may have a thickness of 0.1 mm to 30 mm. Additionally, any of the layers shown in FIGS. 1-5 may be combined in any suitable combination to form a transparency according to the present disclosure. Further, the layers may be combined according to any suitable method. For example, the transparency may include a laminate including substrates that are adhered together through melting, adhesion or curing without use of an interlayer to laminate.

The transparency may be electrodimmable. For example, the transparency may include smart glass, which may also be referred to as switchable glass, a smart window, or a switchable window. The electrodimmable transparency may include any suitable device available in the art such as, for example, a suspended particle device, liquid crystal device, and/or an electrochromic window. The visible light transmittance of the electrodimmable transparency may be changed by the application of an electric current to the electrodimmable transparency. For example, the electrodimmable transparency may include a suspended particle device including a liquid suspension or film including opaque particles between two substrates coated with a transparent conductive material. When an electric current is applied to the transparent conductive material by a control device, the device is in a "light" state where the opaque particles have an ordered arrangement that allows light to pass through the device. In the absence of the electric current, the device is in a "dark" state where the opaque particles have a random arrangement and substantially block light from passing through the device. While the electrodimmable transparency may block light of a wavelength range of 400 nm to 430 nm while in the "dark" state, the electrodimmable transparency in the "dark" state also blocks visible light. The electrodimmable transparency may block greater than 50% of light of a wavelength range of 400 nm to 430 nm from passing through the electrodimmable transparency in both states and the electrodimmable transparency has a total visible light transmittance of greater than 65%, or a total visible light transmittance in the clear state that loses no more than 35% of the remaining light transmittance (e.g., if the electrodimmable transparency in the clear state has a total visible light transmittance of 50% without the additive, the total visible light transmittance of the electrodimmable transparency including the additive that blocks light having a wavelength of 400 nm to 430 nm would be at least 32.5%, based on a 35% reduction in the total visible light transmittance, which otherwise would have been 50%). The electrodimmable transparency may block greater than 70% of the light of the wavelength range of 400 nm to 430 nm from passing through the electrodimmable transparency and the electrodimmable transparency has a total visible light transmittance of greater than 60%. The additive of the present disclosure may be included in any suitable layer of the electrodimmable transparency (e.g., the suspended particle device).

Any of the transparencies disclosed herein may also exhibit additional properties suitable for aircraft applications. For example, the transparency may have a peel adhesion to glass of greater than 4.4 Newton/millimeter (N/mm), a tensile strength of 23,400 kilopascal (kPa) to 45,500 kPa, a Shore Hardness of 64 to 98 A, tear strength of 45.5 N/mm to 94.6 N/mm. The transparency may also exhibit 5 weeks of QUV stability (measured according to ASTM G154-16) with no visible yellowing or discoloration, maintaining greater than 90% blockage of UV light up to a wavelength of 400 nm, and substantially maintained adhesion performance.

The subject matter of the present disclosure will now be described with respect to the following examples. The present disclosure, however, is not limited thereto.

Examples

Example transparencies were prepared using a diisocyanate, a catalyst, an additive, and a polyol (either a polytetramethylene ether glycol or an aliphatic polyester diol). The components and their respective amounts used are listed below in Table 1. In each of the examples, a catalyst (dimethyltin dineodecanoate) was mixed with a diisocyanate (DESMODUR W (4,4'-methylene-bis-(cyclohexyl isocyanate)), commercially available from Bayer Corp. of Pittsburgh, Pa.) in the amounts shown in Table 1 to prepare a mixture. Then, the mixture of additives and diisocyanate was placed into an oven at 120° C. for ten minutes or until substantially all additives were dissolved. Afterwards, the mixture was mixed for 2 to 3 minutes with a polyol (either TERATHANE 1000 (referred to as "T-1000" in Table 1), commercially available from INVISTA of Wichita, Ks., or K-FLEX A307, commercially available from King Industries of Norwalk, Ct.) in the amounts shown in Table 1. The amounts in Table 1 include both wt %, based on 100 wt % of the diisocyanate and the polyol, and mass (e.g., g or mg). The beaker was then placed in an oven for 3 days at 220° F. (104° C.) to prepare a reaction product. The reaction product was then placed on a glass substrate (STARPHIRE® glass commercially available from Vitro Architectural Glass of Cheswick, Pa.) having a thickness of 0.224 inches (5.69 mm). Another glass substrate (STARPHIRE® glass commercially available from Vitro Architectural Glass of Cheswick, Pa.) having a thickness of 0.224 inches (5.69 mm) was placed on the reaction product with tape spacers between the glass substrates to define a spacing of 0.025 inches (0.635 mm). The glass substrates and reaction product were then heat pressed at a temperature of 300° F. (149° C.) for 10 minutes at a pressure sufficient to press the reaction product into a substantially uniform film between the glass substrates, thereby forming a sample including a film between two glass substrates.

TABLE 1

| | Polyol | Isocyanate (DESMODUR W) | Additive | Amount of Additive |
|---|---|---|---|---|
| Example 1 | T-1000 78.6 wt % (30.00 g) | 21.4 wt % (8.15 g) | TINUVIN 292 | 0.21 wt % (82.0 mg) |
| Example 2 | T-1000 78.7 wt % (30.20 g) | 21.3 wt % (8.15 g) | TINUVIN 292 | 0.11 wt % (41.0 mg) |
| | | | TINUVIN 1130 | 0.19 wt % (74.0 mg) |
| Example 3 | K-FLEX A307 75.0 wt % (30.00 g) | 25.0 wt % (10.00 g) | TINUVIN 292 | 0.10 wt % (41.6 mg) |
| | | | TINUVIN 1130 | 0.22 wt % (86 mg) |
| Example 4 | T-1000 78.7 wt % (30.00 g) | 21.3 wt % (8.14 g) | TINUVIN 292 | 0.60 wt % (230.0 mg) |
| | | | TINUVIN 1130 | 1.20 wt % (456.0 mg) |
| | | | TINUVIN CP | 0.05 wt % (19.4 mg) |
| Example 5 | K-FLEX A307 75.3 wt % (30.42 g) | 24.7 wt % (10.00 g) | TINUVIN 292 | 0.61 wt % (245.0 mg) |
| | | | TINUVIN 1130 | 1.20 wt % (485.0 mg) |
| | | | TINUVIN CP | 0.05 wt % (20.0 mg) |
| Example 6 | T-1000 78.7 wt % (30.08 g) | 21.3 wt % (8.16 g) | TINUVIN 292 | 0.11 wt % (41.7 mg) |
| | | | TINUVIN 1130 | 0.21 wt % (79.4 mg) |
| | | | TINUVIN CP | 0.05 wt % (19.5 mg) |
| Example 7 | K-FLEX A307 74.9 wt % (30.35 g) | 25.1 wt % (10.15 g) | TINUVIN 292 | 0.11 wt % (44.4 mg) |
| | | | TINUVIN 1130 | 0.21 wt % (83.3 mg) |
| | | | TINUVIN CP | 0.05 wt % (21.0 mg) |
| Example 8 | T-1000 78.6 wt % (30.00 g) | 21.4 wt % (8.15 g) | TINUVIN 292 | 0.10 wt % (40.0 mg) |
| | | | TINUVIN 1130 | 0.21 wt % (79.0 mg) |
| | | | TINUVIN CP | 0.05 wt % (20.6 mg) |
| | | | TINUVIN 477 | 0.10 wt % (37.9 mg) |
| Example 9 | K-FLEX A307 75.0 wt % (30.00 g) | 25.0 wt % (10.01 g) | TINUVIN 292 | 0.12 wt % (46.2 mg) |
| | | | TINUVIN 1130 | 0.23 wt % (92.1 mg) |
| | | | TINUVIN CP | 0.05 wt % (20.1 mg) |
| | | | TINUVIN 477 | 0.15 wt % (60 mg) |
| Example 10 | T-1000 78.9 wt % (30.38 g) | 21.1 wt % (8.12 g) | TINUVIN 292 | 0.19 wt % (72.5 mg) |
| | | | TINUVIN CP | 0.05 wt % (20.4 mg) |
| | | | TINUVIN 477 | 0.20 wt % (78.9 mg) |
| Example 11 | K-FLEX A307 74.9 wt % (30.00 g) | 25.1 wt % (10.07 g) | TINUVIN 292 | 0.11 wt % (43.6 mg) |
| | | | TINUVIN CP | 0.05 wt % (20.5 mg) |
| | | | TINUVIN 477 | 0.21 wt % (84.9 mg) |
| Example 12 | T-1000 79.0 wt % (30.54 g) | 21.0 wt % (8.12 g) | TINUVIN 152 | 0.31 wt % (118.1 mg) |
| | | | TINUVIN 405 | 0.59 wt % (228.9 mg) |
| Example 13 | K-FLEX A307 74.8 wt % (30.08 g) | 25.2 wt % (10.12 g) | TINUVIN 152 | 0.31 wt % (126.0 mg) |
| | | | TINUVIN 405 | 0.60 wt % (240.0 mg) |
| Example 14 | T-1000 78.9 wt % (30.30 g) | 21.1 wt % (8.10 g) | TINUVIN 152 | 0.30 wt % (115.4 mg) |
| | | | TINUVIN 900 | 0.60 wt % (232.2 mg) |
| Example 15 | K-FLEX A307 74.8 wt % (30.00 g) | 25.2 wt % (10.10 g) | TINUVIN 152 | 0.30 wt % (120.1 mg) |
| | | | TINUVIN 900 | 0.61 wt % (244.9 mg) |
| Example 16 | T-1000 78.6 wt % (30.08 g) | 21.4 wt % (8.20 g) | TINUVIN 152 | 0.10 wt % (39.2 mg) |
| | | | TINUVIN 900 | 0.25 wt % (95.93 mg) |
| Example 17 | K-FLEX A307 75.0 wt % (30.34 g) | 25.0 wt % (10.10 g) | TINUVIN 152 | 0.12 wt % (47.7 mg) |
| | | | TINUVIN 900 | 0.21 wt % (84.8 mg) |
| Example 18 | T-1000 79.1 wt % (30.78 g) | 20.9 wt % (8.12 g) | TINUVIN 152 | 0.10 wt % (37.9 mg) |
| | | | TINUVIN 900 | 0.20 wt % (78.8 mg) |
| | | | CeO$_2$ | 0.99 wt % (386.1 mg) |
| Example 19 | K-FLEX A307 75.1 wt % (30.13 g) | 24.9 wt % (10.00 g) | TINUVIN 152 | 0.10 wt % (41.9 mg) |
| | | | TINUVIN 900 | 0.20 wt % (81.1 mg) |
| | | | CeO$_2$ | 1.01 wt % (404 mg) |
| Example 20 | T-1000 78.6 wt % (30.04 g) | 21.4 wt % (8.19 g) | TINUVIN 152 | 0.11 wt % (42.6 mg) |
| | | | TINUVIN 900 | 0.20 wt % (78.2 mg) |
| | | | ZnO | 1.05 wt % (400.7 mg) |
| Example 21 | T-1000 79.3 wt % (31.29 g) | 20.7 wt % (8.17 g) | TINUVIN 152 | 0.10 wt % (39.8 mg) |
| | | | TINUVIN 405 | 0.19 wt % (76.8 mg) |
| | | | Gen 4D | 0.002 wt % (0.9 mg) |
| Example 22 | K-FLEX A307 75.3 wt % (30.62 g) | 24.7 wt % (10.04 g) | TINUVIN 152 | 0.11 wt % (44.4 mg) |
| | | | TINUVIN 405 | 0.21 wt % (87.2 mg) |
| | | | Gen 4D | 0.002 wt % (1.0 mg) |
| Example 23 | T-1000 78.7 wt % (30.01 g) | 21.3 wt % (8.10 g) | TINUVIN 152 | 0.18 wt % (68 mg) |
| | | | TINUVIN 405 | 0.21 wt % (80.6 mg) |
| | | | Gen 4B | 0.001 wt % (0.4 mg) |
| Example 24 | K-FLEX A307 75.0 wt % (30.05 g) | 25.0 wt % (10.04 g) | TINUVIN 152 | 0.10 wt % (40.3 mg) |
| | | | TINUVIN 405 | 0.21 wt % (84.3 mg) |
| | | | Gen 4B | 0.001 wt % (0.4 mg) |
| Example 25 | T-1000 78.9 wt % (30.54 g) | 21.1 wt % (8.18 g) | CHIGUARD R-55 | 0.59 wt % (229.5 mg) |
| | | | TINUVIN 292 | 0.32 wt % (122.8 mg) |
| Example 26 | K-FLEX A307 74.9 wt % (30.17 g) | 25.1 wt % (10.12 g) | CHIGUARD R-55 | 0.61 wt % (244.5 mg) |
| | | | TINUVIN 292 | 0.32 wt % (120.2 mg) |
| Example 27 | T-1000 78.7 wt % (30.23 g) | 21.3 wt % (8.17 g) | L143-50X | 0.63 wt % (241.2 mg) |
| | | | TINUVIN 292 | 0.30 wt % (116.5 mg) |

TABLE 1-continued

| | Polyol | Isocyanate (DESMODUR W) | Additive | Amount of Additive |
|---|---|---|---|---|
| Example 28 | K-FLEX A307 75.2 wt % (30.42 g) | 24.8 wt % (10.04 g) | L143-50X TINUVIN 292 | 0.61 wt % (248.1 mg) 0.30 wt % (120.7 mg) |

The samples, each including the film between two glass substrates, were then analyzed for total visible light transmittance, % blockage of light at wavelengths of 200 nm to 430 nm, and for thickness. The total visible light transmittance was measured according ASTM D1003-07. The % of light blocked at wavelengths of 200 nm to 430 nm was measured utilizing an Agilent/HP 8453 UV-Vis spectrophotometer commercially available from Agilent Technologies of Santa Clara, Ca. The film thickness, total sample thickness (including the film and two glass substrates), the average % blockage of light across the wavelength range of 400 nm to 420 nm (averaged across the wavelength range of 400 nm to 420 nm, and based on the average of 3 measurements with the standard deviation shown in parentheses), and the total visible light transmittance are shown in Table 2. As may be seen in Table 2, the transparencies of Examples 9 and 11 exhibited substantially lower total visible light transmittance. Additionally, the transparencies of Examples 9 and 11 exhibited discoloration having an observable brownish tint. While the present application is not limited to any particular mechanism or theory, it is believed that the relatively lower total visible light transmittance of the transparencies of Examples 9 and 11 may be attributed to the interaction of the additive (TINUVIN 477) and the polyol (K-FLEX A307). Further, evidence of $CeO_2$ and ZnO nanoparticle agglomerates were observed in polymers of Examples 18, 19, 20 due to stronger inter-particle interactions compared to interactions with the polymer matrix. Nanoparticle solubility in the polymer matrix may be improved by sonication at high temperatures for more than two hours or more, adding a suitable solvent to improve the solubility, nanoparticle surface modifications, or use of other techniques such as solid dispersion of nanoparticles into other solid additives before introducing into the formulation mixture.

TABLE 2

| | Film Thickness | Total Sample Thickness | Average % Blockage of 400 nm to 420 nm (standard deviation) | % Total Visible Light Transmittance |
|---|---|---|---|---|
| Example 1 | 0.025 inches (0.635 mm) | 0.473 inches (12.0 mm) | 14.03 (7.86) | 91.2 |
| Example 2 | 0.027 inches (0.686 mm) | 0.475 inches (12.1 mm) | 17.04 (1.97) | 92.2 |
| Example 3 | 0.297 inches (7.54 mm) | 0.745 inches (18.9 mm) | 9.67 (0.16) | 91.6 |
| Example 4 | 0.026 inches (0.660 mm) | 0.474 inches (12.0 mm) | 66.84 (3.69) | 91.6 |
| Example 5 | 0.029 inches (0.737 mm) | 0.477 inches (12.1 mm) | 64.75 (0.74) | 90.8 |
| Example 6 | 0.028 inches (0.711 mm) | 0.476 inches (12.1 mm) | 62.32 (1.26) | 91.6 |
| Example 7 | 0.026 inches (0.660 mm) | 0.474 inches (12.0 mm) | 66.13 (0.91) | 90.7 |
| Example 8 | 0.029 inches (0.737 mm) | 0.477 inches (12.1 mm) | 71.68 (1.13) | 92.2 |
| Example 9 | 0.027 inches (0.686 mm) | 0.475 inches (12.1 mm) | 91.53 (0.35) | 86.5 |
| Example 10 | 0.030 inches (0.762 mm) | 0.478 inches (12.1 mm) | 68.37 (0.59) | 90.7 |
| Example 11 | 0.027 inches (0.686 mm) | 0.475 inches (12.1 mm) | 96.50 (0.24) | 87.4 |
| Example 12 | 0.027 inches (0.686 mm) | 0.475 inches (12.1 mm) | 36.96 (1.55) | 90.6 |
| Example 13 | 0.025 inches (0.635 mm) | 0.473 inches (12.0 mm) | 18.36 (0.83) | 90.9 |
| Example 14 | 0.027 inches (0.686 mm) | 0.475 inches (12.1 mm) | 55.12 (6.55) | 90.1 |
| Example 15 | 0.028 inches (0.711 mm) | 0.476 inches (12.1 mm) | 48.66 (0.60) | 90.7 |
| Example 16 | 0.045 inches (1.14 mm) | 0.493 inches (12.5 mm) | 49.83 (5.37) | 89.9 |
| Example 17 | 0.027 inches (0.686 mm) | 0.475 inches (12.1 mm) | 36.10 (2.50) | 90.7 |
| Example 18 | 0.028 inches (0.711 mm) | 0.476 inches (12.1 mm) | 49.87 (5.19) | 89.7 |
| Example 19 | 0.034 inches (0.864 mm) | 0.482 inches (12.2 mm) | 28.77 (2.18) | 89.7 |
| Example 20 | 0.028 inches (0.711 mm) | 0.476 inches (12.1 mm) | 51.19 (0.38) | 88.8 |
| Example 21 | 0.030 inches (0.762 mm) | 0.478 inches (12.1 mm) | 64.91 (1.34) | 89.6 |
| Example 22 | 0.039 inches (0.991 mm) | 0.487 inches (12.4 mm) | 64.27 (1.70) | 89.0 |
| Example 23 | 0.029 inches (0.737 mm) | 0.477 inches (12.1 mm) | 76.61 (1.06) | 85.0 |
| Example 24 | 0.025 inches (0.635 mm) | 0.473 inches (12.0 mm) | 66.50 (0.77) | 85.6 |
| Example 25 | 0.025 inches (0.635 mm) | 0.473 inches (12.0 mm) | 34.78 (2.76) | 91.3 |
| Example 26 | 0.032 inches (0.813 mm) | 0.480 inches (12.2 mm) | 35.72 (4.16) | 90.2 |
| Example 27 | 0.025 inches (0.635 mm) | 0.473 inches (12.0 mm) | 35.28 (0.99) | 91.1 |
| Example 28 | 0.026 inches (0.660 mm) | 0.474 inches (12.0 mm) | 31.17 (3.40) | 90.7 |

The % blockage of UVB light across a wavelength range of 280 nm to 315 nm (based on the average of 3 measurements with the standard deviation shown in parentheses), and the % blockage of UVA light across a wavelength range of 315 nm to 400 nm (based on the average of 3 measurements with the standard deviation shown in parentheses) are shown in Table 3.

TABLE 3

| | % UVA (315 nm to 400 nm) Blockage (standard deviation) | % UVB (280 nm to 315 nm) Blockage (standard deviation) |
|---|---|---|
| Example 1 | 23.90 (7.66) | 88.99 (1.31) |
| Example 2 | 85.69 (0.27) | 99.92 (0.00) |
| Example 3 | 86.46 (0.10) | 99.93 (0.00) |
| Example 4 | 99.14 (0.12) | 99.95 (0.00) |
| Example 5 | 99.11 (0.03) | 99.94 (0.00) |
| Example 6 | 97.86 (0.03) | 99.95 (0.00) |
| Example 7 | 97.75 (0.11) | 99.93 (0.01) |
| Example 8 | 99.15 | 99.95 |

TABLE 3-continued

| | % UVA (315 nm to 400 nm) Blockage (standard deviation) | % UVB (280 nm to 315 nm) Blockage (standard deviation) |
|---|---|---|
| | (0.02) | (0.00) |
| Example 9 | 99.79 | 99.95 |
| | (0.01) | (0.00) |
| Example 10 | 99.13 | 99.95 |
| | (0.03) | (0.00) |
| Example 11 | 99.89 | 99.95 |
| | (0.01) | (0.00) |
| Example 12 | 87.98 | 99.95 |
| | (0.31) | (0.00) |
| Example 13 | 84.35 | 99.95 |
| | (0.16) | (0.00) |
| Example 14 | 97.46 | 99.95 |
| | (0.38) | (0.00) |
| Example 15 | 97.74 | 99.96 |
| | (0.03) | (0.00) |
| Example 16 | 94.87 | 99.96 |
| | (0.55) | (0.00) |
| Example 17 | 93.60 | 99.96 |
| | (0.24) | (0.01) |
| Example 18 | 94.94 | 99.96 |
| | (0.54) | (0.00) |
| Example 19 | 92.47 | 99.95 |
| | (0.23) | (0.00) |
| Example 20 | 94.84 | 99.96 |
| | (0.04) | (0.00) |
| Example 21 | 84.30 | 99.96 |
| | (0.48) | (0.00) |
| Example 22 | 81.44 | 99.95 |
| | (0.71) | (0.00) |
| Example 23 | 86.76 | 99.96 |
| | (0.55) | (0.00) |
| Example 24 | 82.48 | 99.95 |
| | (0.44) | (0.00) |
| Example 25 | 95.20 | 99.95 |
| | (0.23) | (0.00) |
| Example 26 | 96.02 | 99.95 |
| | (0.25) | (0.00) |
| Example 27 | 84.38 | 99.96 |
| | (0.20) | (0.00) |
| Example 28 | 83.44 | 99.95 |
| | (0.84) | (0.00) |

Additionally, the average % blockage of light across the wavelength range of 400 nm to 430 nm (averaged across the wavelength range of 400 nm to 430 nm, and based on the average of 3 measurements with the standard deviation shown in parentheses), the average % blockage of light across the wavelength range of 400 nm to 410 nm (averaged across the wavelength range of 400 nm to 410 nm, and based on the average of 3 measurements with the standard deviation shown in parentheses), the average % blockage of light across the wavelength range of 380 nm to 410 nm (averaged across the wavelength range of 380 nm to 410 nm, and based on the average of 3 measurements with the standard deviation shown in parentheses), and the average % blockage of light across the wavelength range of 200 nm to 420 nm (averaged across the wavelength range of 200 nm to 420 nm, and based on the average of 3 measurements with the standard deviation shown in parentheses) for Examples 4, 5, 8, 9, 10, 21, 22, 23, and 24 are shown in Table 4.

TABLE 4

| | Average % Blockage of 400 nm to 430 nm | Average % Blockage of 400 nm to 410 nm | Average % Blockage of 380 nm to 410 nm | Average % Blockage of 200 nm to 420 nm |
|---|---|---|---|---|
| Example 4 | 56.40 | 79.21 | 90.85 | 96.65 |
| Example 5 | 54.00 | 77.77 | 90.31 | 96.44 |
| Example 8 | 61.45 | 82.77 | 92.08 | 97.09 |
| Example 9 | 85.32 | 96.56 | 98.47 | 99.17 |
| Example 10 | 57.11 | 80.88 | 91.42 | 96.78 |
| Example 21 | 63.63 | 51.19 | 50.43 | 90.77 |
| Example 22 | 57.16 | 45.83 | 42.02 | 89.61 |
| Example 23 | 80.16 | 61.97 | 58.86 | 92.77 |
| Example 24 | 71.90 | 48.99 | 46.07 | 90.21 |

Figure 6:
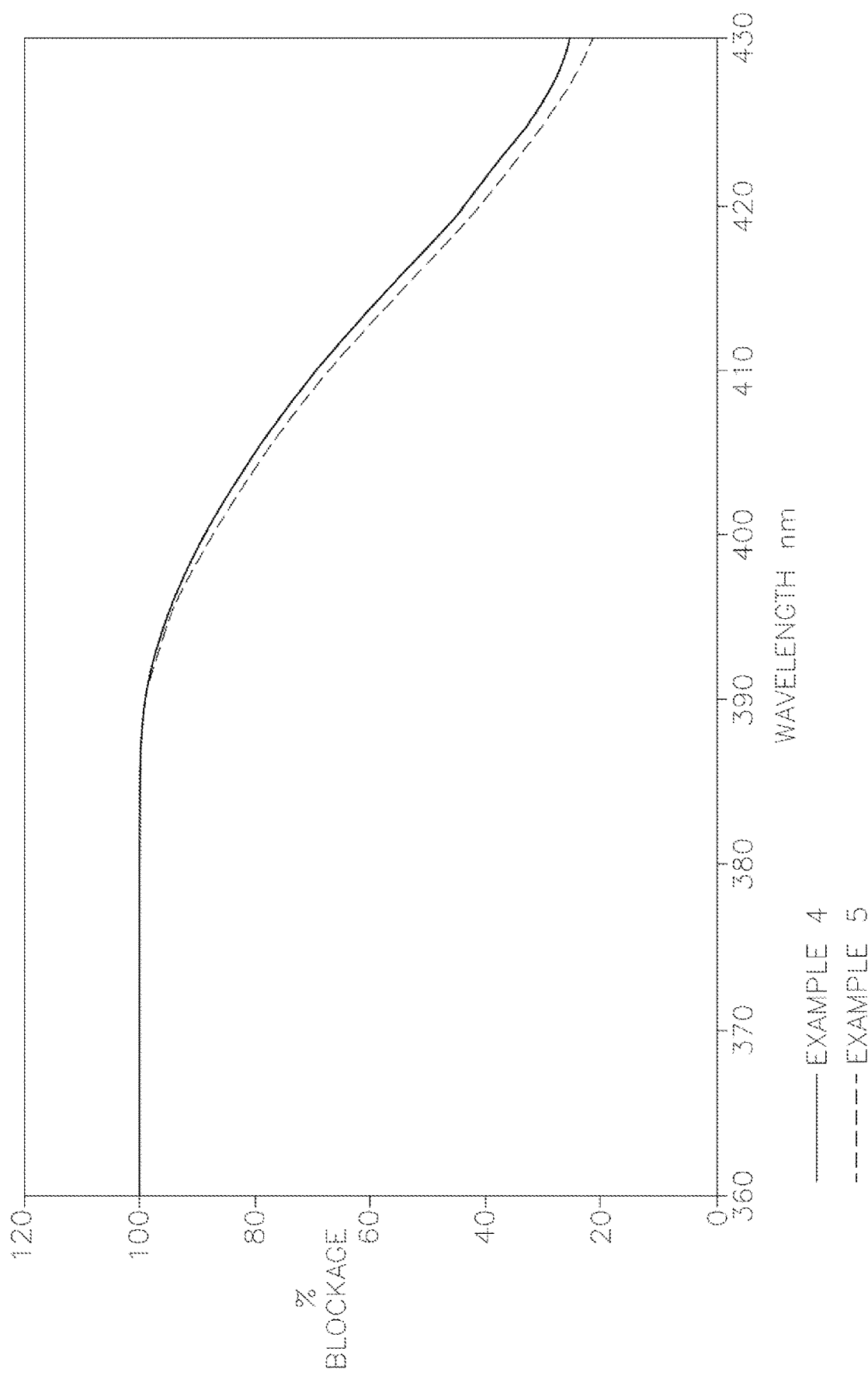
FIG. 6 is a graph showing % light blocked versus wavelength of light for respective transparencies of Examples 4 and 5.
Figure 7:
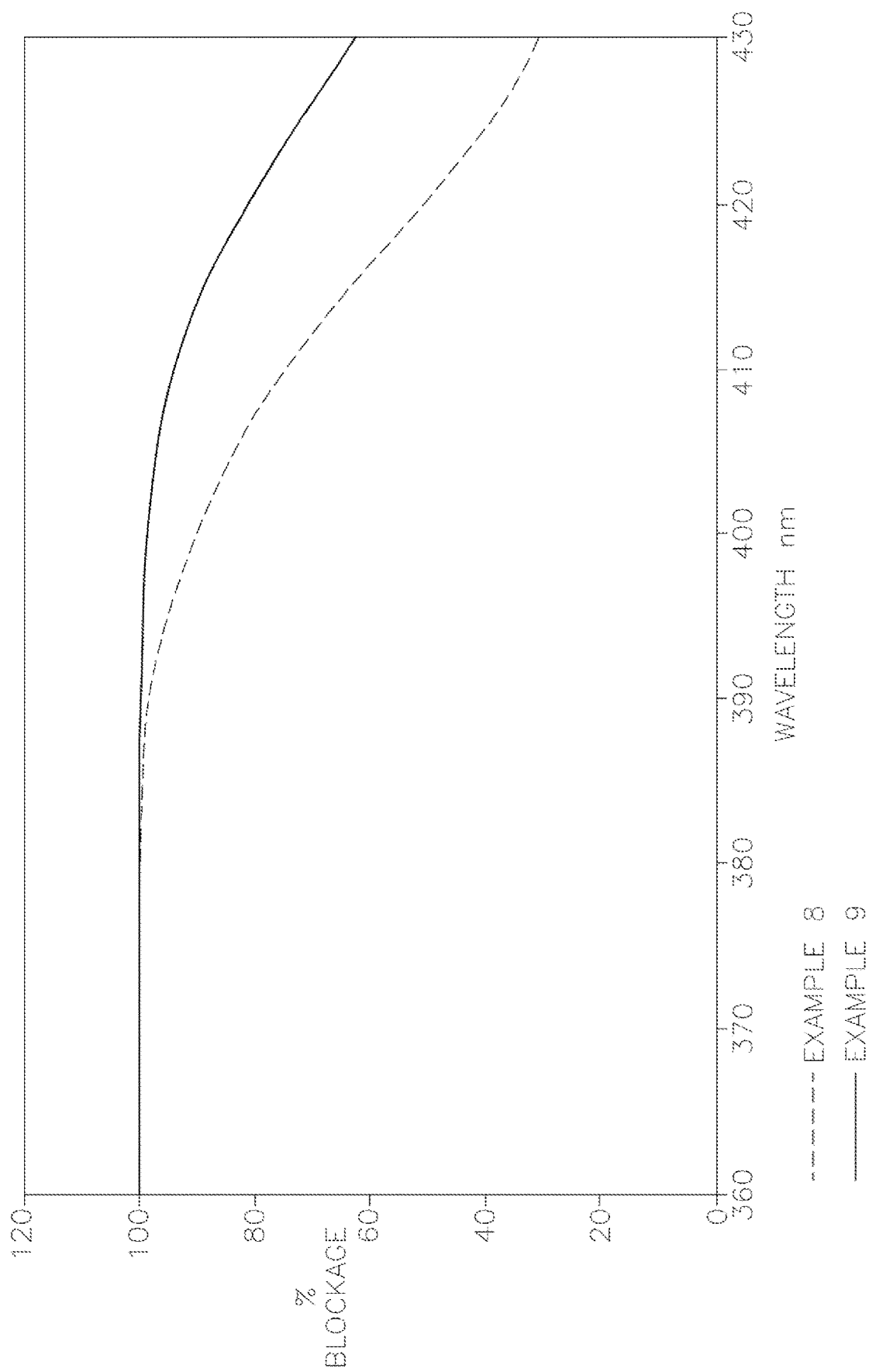
FIG. 7 is a graph showing % light blocked versus wavelength of light for respective transparencies of Examples 8 and 9.
Figure 8:
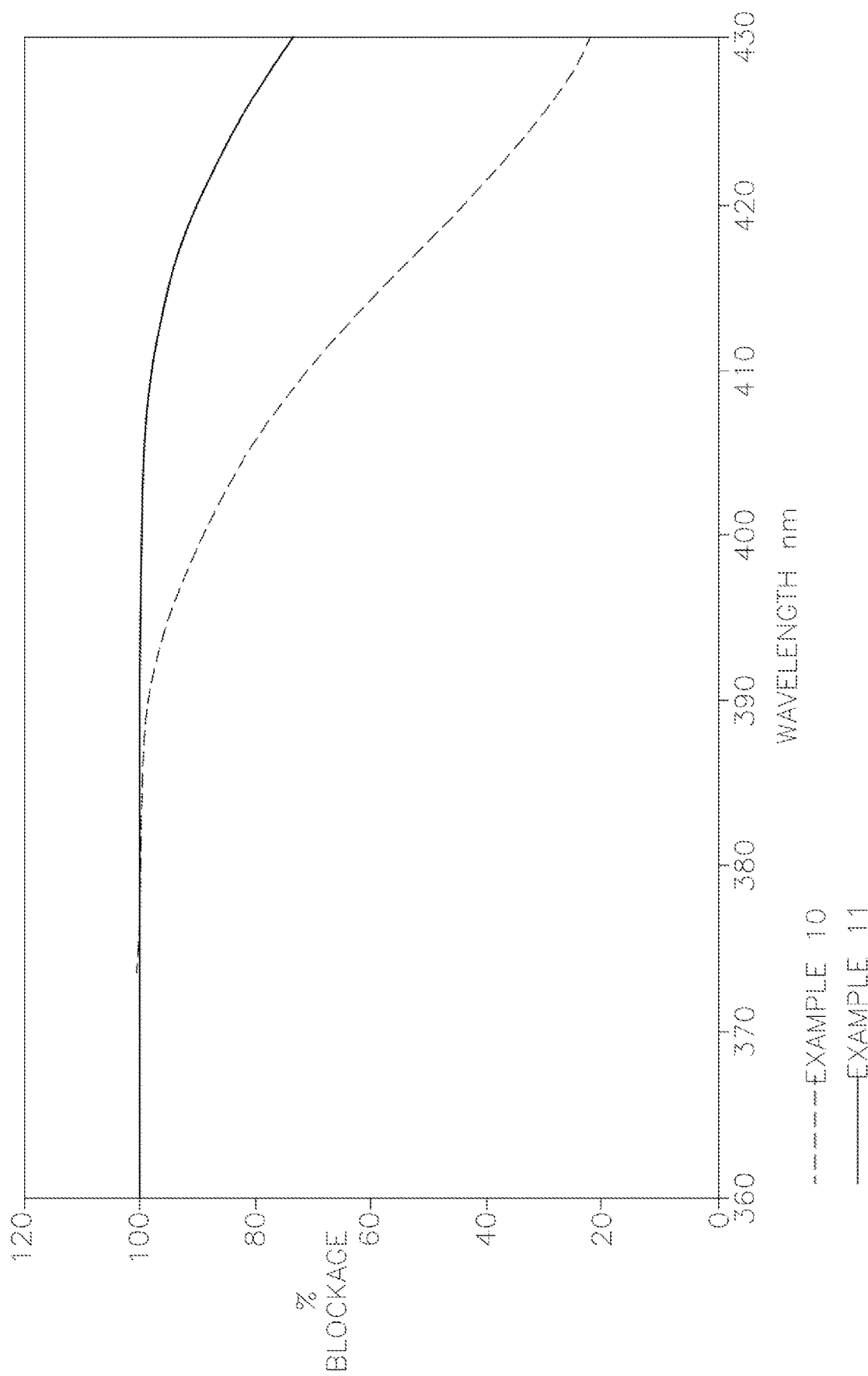
FIG. 8 is a graph showing % light blocked versus wavelength of light for respective transparencies of Examples 10 and 11.
Figure 9:
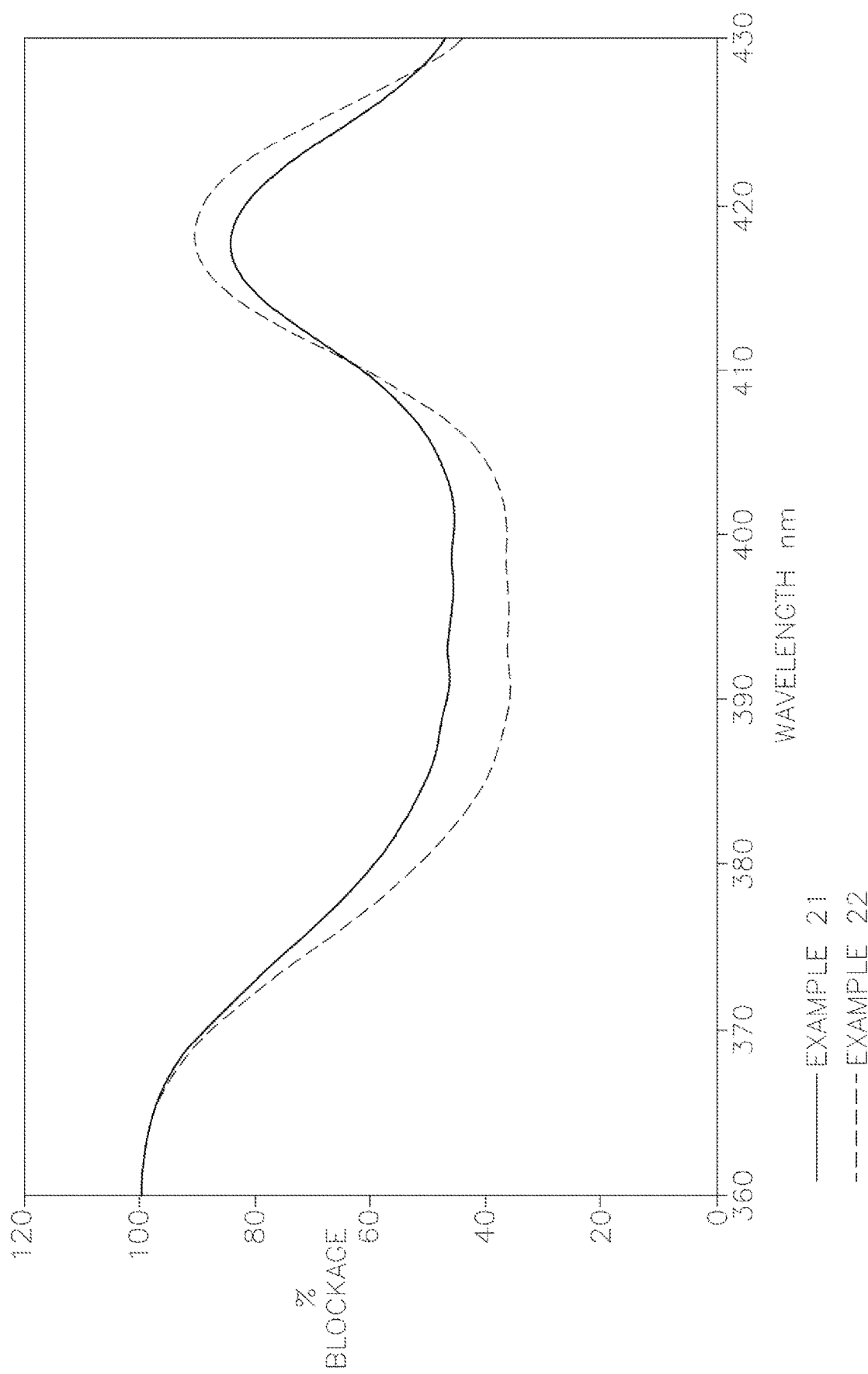
FIG. 9 is a graph showing % light blocked versus wavelength of light for respective transparencies of Examples 21 and 22.
Figure 10:
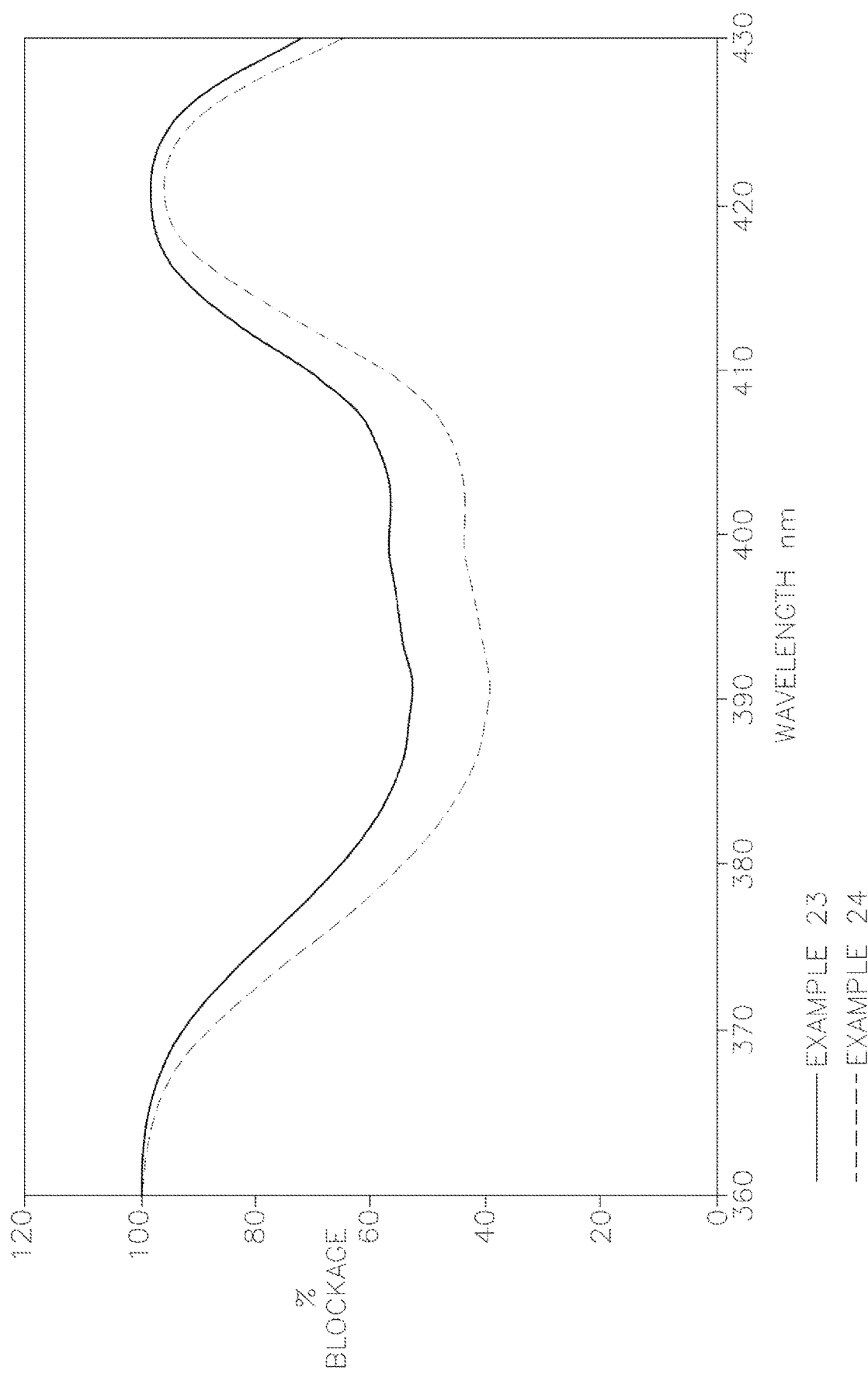
FIG. 10 is a graph showing % light blocked versus wavelength of light for respective transparencies of Examples 23 and 24.

FIG. 6 is a graph showing spectra of the % blockage of light of the wavelength range of 360 nm to 430 nm (each based on the average of 3 measurements) for the samples of Examples 4 and 5. FIG. 7 is a graph showing spectra of the % blockage of light of the wavelength range of 360 nm to 430 nm (each based on the average of 3 measurements) for the samples of Examples 8 and 9. FIG. 8 is a graph showing spectra of the % blockage of light of the wavelength range of 360 nm to 430 nm (each based on the average of 3 measurements) for the samples of Examples 10 and 11. FIG. 9 is a graph showing spectra of the % blockage of light of the wavelength range of 360 nm to 430 nm (each based on the average of 3 measurements) for the samples of Examples 21 and 22. FIG. 10 is a graph showing spectra of the % blockage of light of the wavelength range of 360 nm to 430 nm (each based on the average of 3 measurements) for the samples of Examples 23 and 24.

In the preceding detailed description, only certain examples of the subject matter of the present disclosure are shown and described, by way of illustration. As those skilled in the art would recognize, the subject matter of the present disclosure may be embodied in many different forms and should not be construed as being limited to the description set forth herein. Also, in the context of the present disclosure, when a first element is referred to as being "on" a second element, it may be directly on the second element or be indirectly on the second element with one or more intervening elements interposed therebetween. Like reference numerals designate like elements throughout the specification. In the drawings, thicknesses may be exaggerated for convenience.

The word "comprising" and forms of the word "comprising" as used in this description and in the claims does not limit the recited subject matter to exclude any variants or additions. Although various features of the present disclosure have been described using the terms "comprising" or "including", features consisting essentially of or consisting of are also within the scope of this disclosure. For example, while features of this disclosure have been described in terms of an additive chosen from inorganic nanoparticles, organic nanoparticles, organometallic nanoparticles, benzotriazoles, triazines, benzophenones, hindered amine light stabilizers, benzoates, cyanoacrylates, tetraphenylporphyrins, tetramesitylporphyrins, perylenes, phthalocyanines, chlorophylls, bilirubin, primary antioxidants, pigments, dyes, and combinations thereof, the additive consisting essentially of or consisting of any one of the inorganic nanoparticles, organic nanoparticles, organometallic nanoparticles, benzotriazoles, triazines, benzophenones, hindered amine light stabilizers, benzoates, cyanoacrylates, tetraphenylporphyrins, tetramesitylporphyrins, perylenes, phthalocyanines, chlorophylls, bilirubin, primary antioxidants, pigments, and/or dyes is also within the scope of this disclosure. In this context, "consisting essentially of" means that any additional components of the additive will not materially affect the light blockage properties (e.g., blockage of the light of the wavelength of 400 nm to 430 nm) of a transparency including the additive. As used herein, the term "plurality", means two or more.

As used herein, unless otherwise expressly specified, all numbers such as those expressing values, ranges, amounts or percentages may be read as if prefaced by the word "about", even if the term does not expressly appear. Plural encompasses singular and vice versa. For example, while features of the present disclosure have been described in terms of "an" additive, one or more of this or other recited components may be used according to the present disclosure. Also, as used herein, the term "polymer" is meant to refer to prepolymers, oligomers, and both homopolymers and copolymers; the prefix "poly" refers to two or more. When ranges are given, any endpoints of those and/or numbers within those ranges may be combined within the scope of the present disclosure. Including and like terms means "including but not limited to". Similarly, as used herein, the terms "on" and "formed on" mean formed, overlaid, deposited, or provided on but not necessarily in contact with the surface, unless otherwise indicated. For example, an interlayer "formed on" a substrate does not preclude the presence of one or more other coating layers of the same or different composition located between the formed interlayer and the substrate, unless otherwise indicated. On the other hand, as used herein, the terms "directly on", "formed directly on", and "laminated directly on" mean in physical contact with the surface. For example, an interlayer directly on, formed directly on, or laminated directly on a substrate is in direct physical contact with the substrate. In addition, it will also be understood that when an element or layer is referred to as being "between" two elements or layers, it may be the only element or layer between the two elements or layers, or one or more intervening elements or layers may also be present.

Notwithstanding that the numerical ranges and parameters setting forth the broad scope of the present disclosure are approximations, numerical values set forth in the specific examples are reported as precisely as is practical. Any numerical value, however, may inherently contain certain errors necessarily resulting from the standard variation found in their respective testing measurements.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" may encompass both an orientation of above and below. The device may be otherwise oriented (e.g., rotated 90 degrees or at other orientations) and the spatially relative descriptors used herein should be interpreted accordingly.

As used herein, the term "and/or" includes any and all combinations of one or more of the associated listed items. As used herein, the terms "substantially," "about," and similar terms are used as terms of approximation and not as terms of degree, and are intended to account for the inherent deviations in measured or calculated values that would be recognized by those of ordinary skill in the art. As used herein, the terms "use," "using," and "used" may be considered synonymous with the terms "utilize," "utilizing," and "utilized," respectively.

Whereas particular embodiments of the present disclosure have been described herein for purposes of illustration, it will be evident to those skilled in the art that numerous variations of the details of the present disclosure may be made without departing from the invention as defined in the appended claims.

ASPECTS OF THE INVENTION

Non-limiting aspects of the present invention include:
A transparency comprising:
an additive such that the transparency blocks greater than 50% of light of a wavelength range of 400 nm to 430 nm as measured by ultraviolet-visible spectroscopy from passing through the transparency and the transparency has a total visible light transmittance greater than 60% as measured by way of ASTM D1003-07.
2. The transparency of aspect 1, wherein the transparency blocks greater than 50% of light of a wavelength range of 400 nm to 430 nm from passing through the transparency and the transparency has a total visible light transmittance greater than 65%.
3. The transparency of any preceding aspect, wherein the transparency blocks greater than 65% of light of a wavelength range of 400 nm to 430 nm from passing through the transparency.
4. The transparency of any preceding aspect, wherein the transparency blocks greater than 70% of the light of the wavelength range of 400 nm to 430 nm from passing through the transparency and the transparency has a total visible light transmittance of greater than 60%.
5. The transparency of any preceding aspect, wherein the transparency blocks greater than 75% of light of a wavelength range of 400 nm to 430 nm from passing through the transparency.
6. The transparency of any preceding aspect, wherein the additive comprises a pyrrolo[3,4-f]benzotriazole-5,7 (2H,6H)-dione.
7. The transparency of any preceding aspect, wherein the additive comprises 6-butyl-2-[2-hydroxy-3-(1-methyl-1-phenylethyl)-5-(1,1,3,3-tetramethylbutyl)phenyl] pyrrolo[3,4-f]benzotriazole-5,7(2H,6H)-dione in an amount of 0.01 wt % to 2.0 wt %, based on the total weight of the transparency.
8. The transparency of any preceding aspect, wherein the additive comprises the benzotriazole, the dye, the hindered amine light stabilizer, or the combination thereof in an amount of 0.01 wt % to 1.5 wt %, based on the total weight of the transparency.
9. The transparency of any preceding aspect, wherein the transparency blocks greater than 70% of light of a wavelength range of 100 nm to 315 nm from passing through the transparency.

10. The transparency of any preceding aspect, wherein the transparency is electrodimmable.

11. A vehicle comprising the transparency of any one of the preceding aspects.

12. The vehicle of aspect 11, wherein the vehicle is an aircraft.

13. The transparency of aspect 1 or the vehicle of aspect 12, wherein the transparency comprises a window, a windshield, and/or a canopy.

14. A ballistic shield comprising the transparency of any one of aspects 1 to 10.

15. The transparency of any one of aspects 1 to 10, wherein the transparency comprises:

a first substrate;

a second substrate on the first substrate; and an interlayer between the first substrate and the second substrate, wherein the additive is present in the first substrate, the second substrate, the interlayer, or a combination thereof.

What is claimed is:

1. A transparency comprising:

a first substrate;

an interlayer on the first substrate;

a second substrate on the interlayer;

wherein the interlayer has a thickness of 0.1 to 25 mm, comprises one chosen from glass, polycarbonate, allyl diglycol carbonate, silicone, and combinations thereof, and further comprises an additive such that the transparency blocks greater than 50% of light of a wavelength range of 400 nm to 430 nm as measured by ultraviolet-visible spectroscopy from passing through the transparency;

wherein the transparency has a total visible light transmittance greater than 65% as measured by way of ASTM D1003-07;

wherein the transparency is not electrodimmable;

wherein the transparency blocks at least 90% of light having a wavelength of 380 to 410 nm as measured by ultraviolet-visible spectroscopy from passing through the transparency; and the transparency further comprises a plastic comprising a reaction product of components comprising an isocyanate and an aliphatic polyol having 4 to 18 carbon atoms and 2 hydroxyl groups, wherein the isocyanate and the aliphatic polyol are independently branched or unbranched, and wherein the additive is included in the transparency by mixing with said isocyanate and said aliphatic polyol.

2. The transparency of claim 1, wherein the transparency blocks greater than 65% of light of a wavelength range of 400 nm to 430 nm from passing through the transparency.

3. The transparency of claim 1, wherein the additive comprises a pyrrolo[3,4-f]benzotriazole-5,7(2H,6H)-dione.

4. The transparency of claim 3, wherein the pyrrolo[3,4-f]benzotriazole-5,7 (2H,6H)-dione comprises 6-butyl-2-[2-hydroxy-3-(1-methyl-1-phenylethyl)-5-(1,1,3,3-tetramethylbutyl)phenyl] pyrrolo[3,4-f]benzotriazole-5,7(2H,6H)-dione in an amount of 0.01 wt % to 2.0 wt %, based on the total weight of the transparency.

5. A vehicle comprising the transparency of claim 1.

6. The vehicle of claim 5, wherein the vehicle is an aircraft.

7. The vehicle of claim 6, wherein the transparency comprises a window, a windshield, and/or a canopy.

8. A ballistic shield comprising the transparency of claim 1.

9. A transparency comprising:

a first substrate;

an interlayer on the first substrate;

second substrate on the interlayer;

wherein the interlayer has a thickness of 0.1 to 25 mm, comprises one chosen from glass, polycarbonate, allyl diglycol carbonate, silicone, and combinations thereof, and further comprises an additive such that the transparency blocks greater than 70% of the light of the wavelength range of 400 nm to 430 nm as measured by ultraviolet-visible spectroscopy from passing through the transparency and the transparency has a total visible light transmittance of greater than 60% as measured by way of ASTM D1003-07;

wherein the transparency is not electrodimmable;

wherein the transparency blocks at least 90% of light having a wavelength of 380 to 410 nm as measured by ultraviolet-visible spectroscopy from passing through the transparency; and the transparency further comprises a plastic comprising a reaction product of components comprising an isocyanate and an aliphatic polyol having 4 to 18 carbon atoms and 2 hydroxyl groups, wherein the isocyanate and the aliphatic polyol are independently branched or unbranched, and wherein the additive is included in the transparency by mixing with said isocyanate and said aliphatic polyol.

10. The transparency of claim 9, wherein the transparency blocks greater than 75% of light of a wavelength range of 400 nm to 430 nm from passing through the transparency.

11. The transparency of claim 9, wherein the additive comprises a pyrrolo[3,4-f]benzotriazole-5,7(2H,6H)-dione.

12. The transparency of claim 11, wherein the pyrrolo[3,4-f]benzotriazole-5,7(2H,6H)-dione comprises 6-butyl-2-[2-hydroxy-3-(1-methyl-1-phenylethyl)-5-(1,1,3,3-tetramethylbutyl)phenyl] pyrrolo[3,4-f]benzotriazole-5,7(2H,6H)-dione in an amount of 0.01 wt % to 2.0 wt %, based on the total weight of the transparency.

13. The transparency of claim 9, wherein the additive is further present in the first substrate, the second substrate, and/or a combination thereof.

14. A vehicle comprising the transparency of claim 9.

15. The vehicle of claim 14, wherein the vehicle is an aircraft.

16. The vehicle of claim 15, wherein the transparency comprises a window, a windshield, and/or a canopy.

17. A ballistic shield comprising the transparency of claim 9.

* * * * *